US012358706B2

(12) United States Patent
Faulkner

(10) Patent No.: US 12,358,706 B2
(45) Date of Patent: Jul. 15, 2025

(54) CONTACT LENS PACKAGING

(71) Applicant: F&S Tool, Inc., Erie, PA (US)

(72) Inventor: James D. Faulkner, Erie, PA (US)

(73) Assignee: F&S Tool, Inc., Erie, PA (US)

( * ) Notice: Subject to any disclaimer, the term of this patent is extended or adjusted under 35 U.S.C. 154(b) by 235 days.

(21) Appl. No.: 17/986,082

(22) Filed: Nov. 14, 2022

(65) Prior Publication Data

US 2023/0144078 A1 May 11, 2023

Related U.S. Application Data

(60) Provisional application No. 63/278,369, filed on Nov. 11, 2021.

(51) Int. Cl.
| | | |
|---|---|---|
| *B65D 75/32* | (2006.01) | |
| *B29C 45/17* | (2006.01) | |
| *B29C 45/26* | (2006.01) | |
| *B29C 45/73* | (2006.01) | |

(52) U.S. Cl.
CPC ........ *B65D 75/325* (2013.01); *B29C 45/1735* (2013.01); *B29C 45/2602* (2013.01); *B29C 45/73* (2013.01); *B65D 2585/545* (2013.01)

(58) Field of Classification Search
CPC ............ B65D 75/325; B65D 2585/545; B65D 75/326; B29C 45/1735; B29C 45/2602; B29C 45/73; B29C 2045/2716; B29C 45/2711; B29C 45/38; B29L 2031/712
USPC ........................................................ 206/5.1
See application file for complete search history.

(56) References Cited

U.S. PATENT DOCUMENTS

| | | | |
|---|---|---|---|
| 5,467,868 A * | 11/1995 | Abrams ................ | A61F 2/1691 |
| | | | 134/901 |
| 5,515,964 A * | 5/1996 | Bauman ............... | A45C 11/005 |
| | | | 206/210 |
| D371,678 S | 7/1996 | Borghorst et al. | |
| 5,609,246 A | 3/1997 | Borghorst et al. | |
| 10,901,236 B2 * | 1/2021 | Schweizer .......... | A45C 11/046 |
| 11,834,245 B2 * | 12/2023 | Alayon Rivera .... | B65D 75/367 |
| 2003/0029736 A1 * | 2/2003 | Phillips ................. | B65D 85/54 |
| | | | 206/5.1 |

(Continued)

FOREIGN PATENT DOCUMENTS

| | | |
|---|---|---|
| WO | 2014/030047 A1 | 2/2014 |
| WO | 2021/176760 A1 | 9/2021 |

OTHER PUBLICATIONS

European Patent Office, "International Preliminary Report on Patentability," issued in related International Patent Application No. PCT/US2022/049774 mailed May 2, 2024 (9 pages).

(Continued)

*Primary Examiner* — Andrew D Perreault
(74) *Attorney, Agent, or Firm* — Barnes & Thornburg LLP

(57) ABSTRACT

Packages, systems, and methods of the present disclosure are generally directed to the use of side gating in injection molding to form packaging for contact lenses. As compared to gating along a top surface of a contact lens package, the use of a side gate in injection molding to form a package for contact lenses may significantly reduce the time required to cool plastic in the injection mold, thus offering potential to reduce the overall cycle time for the injection molding process and increase fabrication throughput of the package.

10 Claims, 32 Drawing Sheets

(56) References Cited

U.S. PATENT DOCUMENTS

| | | | |
|---|---|---|---|
| 2006/0237335 A1* | 10/2006 | Py .................. | A45C 11/005 |
| | | | 206/5.1 |
| 2008/0023345 A1* | 1/2008 | Tokarski ............. | A45C 11/005 |
| | | | 514/772.3 |
| 2020/0236796 A1 | 7/2020 | Hwang et al. | |

OTHER PUBLICATIONS

International Search Report and Written Opinion received in related International Application No. PCT/US2022/049774 dated Feb. 1, 2023.

* cited by examiner

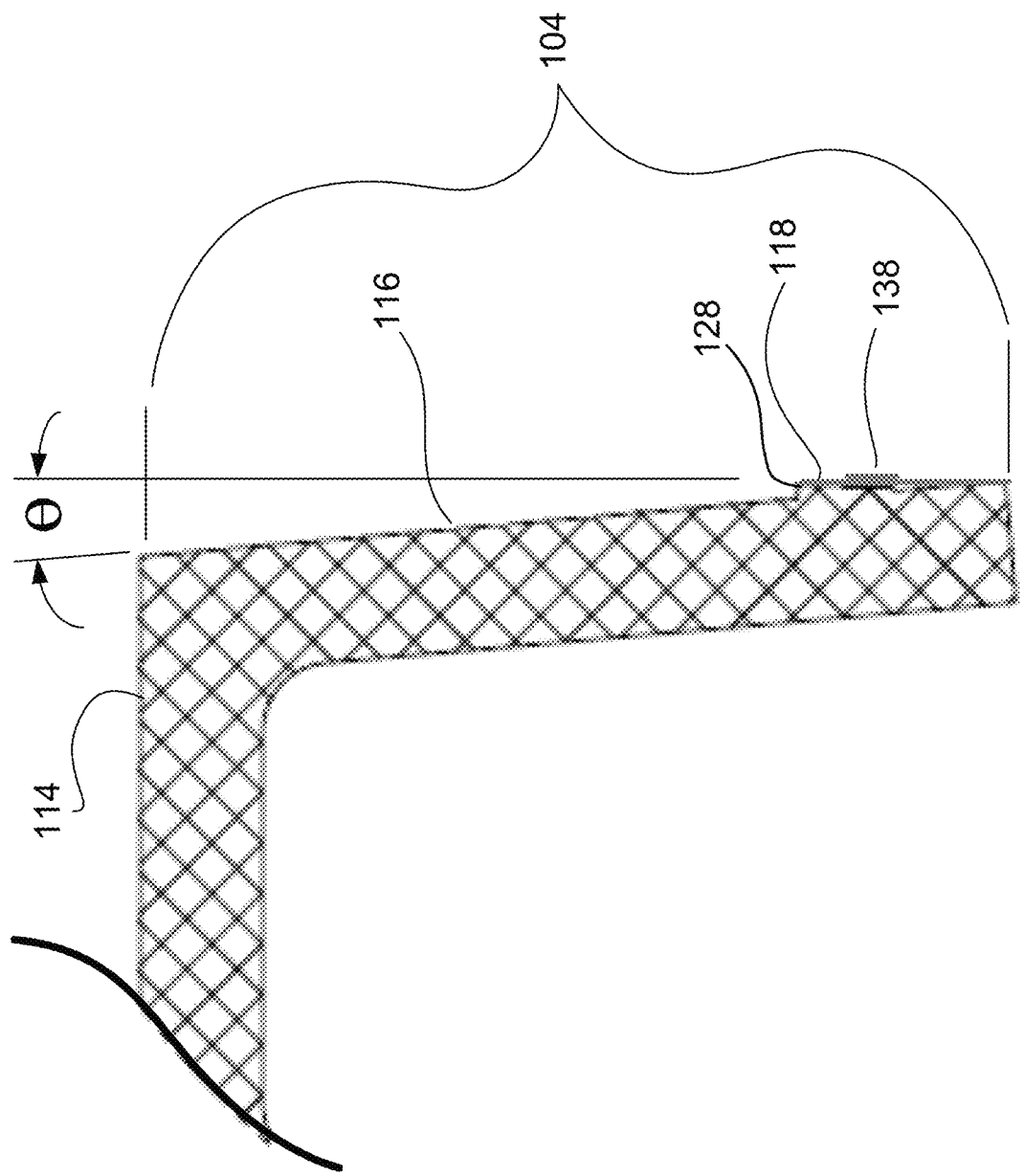

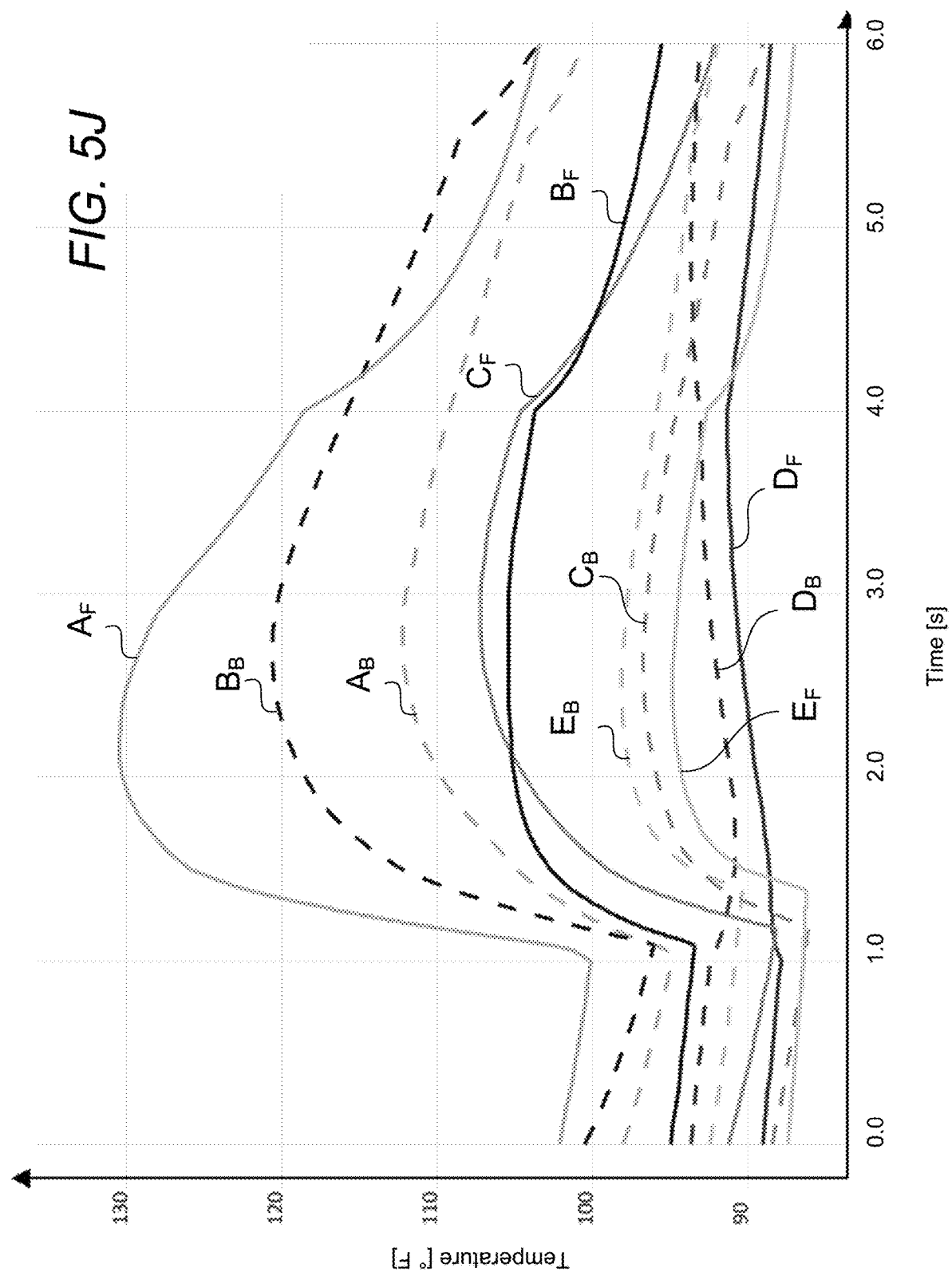

Time: 6.000s

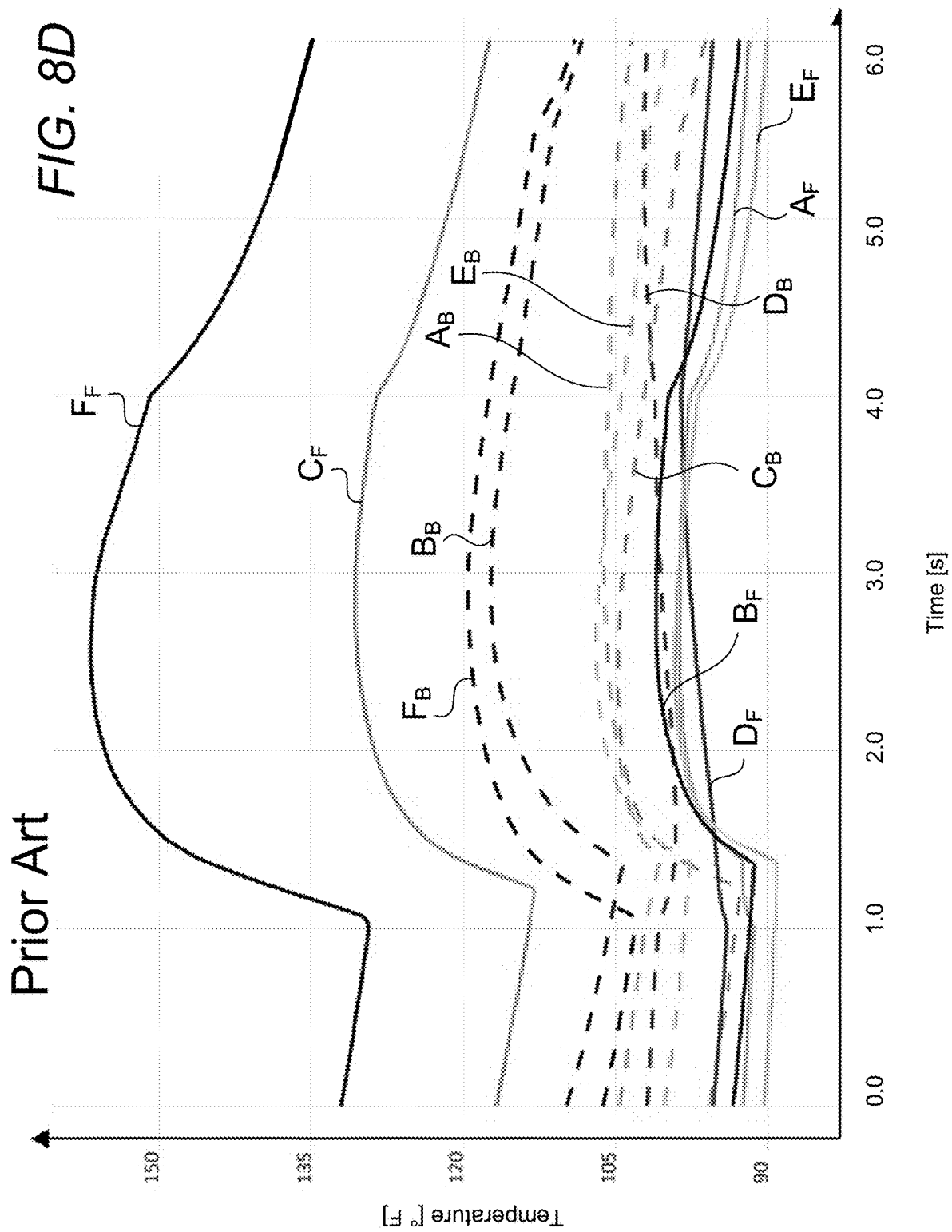

CONTACT LENS PACKAGING

CROSS-REFERENCE TO RELATED APPLICATIONS

This application claims the benefit of priority to U.S. Provisional Patent Application No. 63/278,369, entitled "CONTACT LENS PACKAGING," filed Nov. 11, 2021, the entire contents of which are hereby incorporated herein by reference.

BACKGROUND

Contact lenses are packaged in blister packs. Each blister pack typically includes a package defining a recess, and a cover (e.g., a foil layer) enclosing the contact lens in the recess. The package provides structural protection to the contact lens in the recess while the contact lens is easily accessible through removal of the foil. Injection molding of plastic is used to fabricate the package in large quantities. However, the cycle-time associated with injection molding the package can limit production throughput of blister packs of contact lenses. Accordingly, there remains a need for reducing the cycle time for injection molding packages used in blister packs for contact lenses.

SUMMARY

Packages, systems, and methods of the present disclosure are generally directed to the use of side gating in injection molding to form packaging for contact lenses. As compared to gating along a top surface of a contact lens package, the use of a side gate in injection molding to form a package for contact lenses may significantly reduce the time required to cool plastic in the injection mold, thus offering potential to reduce the overall cycle time for the injection molding process and increase fabrication throughput of the package.

According to one aspect, a package for a contact lens may include a base including a first surface and a second surface, the first surface opposite the second surface, the first surface and the second surface forming a reservoir, the first surface concave along the reservoir and defining a recess, the second surface convex along the reservoir, the first surface forming a rim region circumscribing the recess, and the rim region defining a plane, and one or more walls, the one or more walls collectively including a wipe surface and at least one draft surface, the at least one draft surface extending from the base in at least one direction oblique to the plane defined by the rim region, and the wipe surface perpendicular to the plane defined by the rim region.

In certain implementations, the first surface may have a first surface area, the second surface has a second surface area, a third surface area is collectively defined by the wipe surface and the at least one draft surface, and the third surface area less than at least one of the first surface area or the second surface area.

In some implementations, the wipe surface and the at least one draft surface may each face away from the reservoir.

In certain implementations, the wipe surface may be spaced apart from each one of the first surface and the second surface.

In some implementations, the reservoir may have a curvilinear two-dimensional profile perpendicular to the plane defined by the rim region of the first surface.

In certain implementations, the base and the one or more walls may be formed of at least on polymer.

In some implementations, the rim region may define an orifice extending from the first surface to the second surface of the base. In some cases, along the plane defined by the rim region of the first surface of the base, the recess may be between the orifice and at least one of the one or more walls. Additionally, or alternatively, the recess may have a first area along the plane, the orifice has a second area along the plane, and the first area is greater than the second area.

In certain implementations, the one or more walls and the reservoir may be sized to support the plane defined by the rim region in a stable orientation with the one or more walls and the reservoir positioned on a horizontal surface and the rim region facing away from the horizontal surface.

According to another aspect, a system for fabricating a package for a contact lens may include a first mold portion including a convex section, a planar section circumscribing the convex section, at least one draft section extending oblique to the planar section, and a wipe section defining a side gate having an aperture in a plane perpendicular to the planar section, a second mold portion releasably engageable with the first mold portion to define a cavity therebetween, the second mold portion including a concave section opposite the convex section of the first mold portion along the cavity, and a nozzle in fluid communication with the cavity at the aperture of the side gate defined by the wipe section.

In some implementations, the wipe section may extend from the at least one draft section.

In certain implementations, the first mold portion may define a first cooling circuit, the second mold portion defines a second cooling circuit, and the side gate defines an axis extending between the first cooling circuit and the second cooling circuit without intersecting either one of the first cooling circuit or the second cooling circuit. As an example, at least a portion of the first cooling circuit is adjacent to the concave section of the first mold portion, and at least a portion of the second cooling circuit is adjacent to the convex section of the second mold portion.

In some implementations, the wipe section of the first mold portion may be spaced apart from the planar section of the first mold portion.

In certain implementations, the convex section of the first mold portion may have a curvilinear two-dimensional profile perpendicular to the planar section of the first mold portion.

According to another aspect, a method of fabricating a package for a contact lens may include moving a first mold portion and a second mold portion together along an axis to define a cavity, injecting a molten form of a polymer from a nozzle into the cavity through an aperture of a side gate defined by the first mold portion, in the cavity, cooling the molten form of the polymer into a part having a base and one or more walls, the base having a rim region and a reservoir, the reservoir circumscribed by the rim region, and the one or more walls extending away from the base with at least one of the one or more walls oblique to the axis, and in a direction parallel to the axis, shearing the polymer at least at an interface between the nozzle and the aperture of the side gate.

In certain implementations, injecting the molten form of the polymer may include heating the polymer above a temperature of about 250° C.

In some implementations, shearing the polymer may include moving the first mold portion and the second mold portion away from each other along the axis.

In certain implementations, cooling the molten form of the polymer may include cooling the first mold portion with a first liquid coolant moving through a first cooling circuit and cooling the second mold portion with a second liquid coolant moving through a second cooling circuit, and the molten form of the polymer is injected into the cavity between the first cooling circuit and the second cooling circuit.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 1E is an enlarged cross-sectional view of the package of FIG. 1A, taken at E-E in FIG. 1B.

FIG. 5J is a graph showing temperature distributions as a function of time at the virtual thermocouple locations of FIG. 4 during the simulated injection cycle for forming the package of FIG. 1A using side-gating and conventional cooling.

FIG. 8D is a graph showing simulated temperature distributions at front and back side surface regions of the package of FIGS. 8A-8C during the simulated cycle of injection molding the package using valve gating according to the prior art and using conformal cooling.

Like reference symbols in the various drawings indicate like elements.

DETAILED DESCRIPTION

Figure 1A:
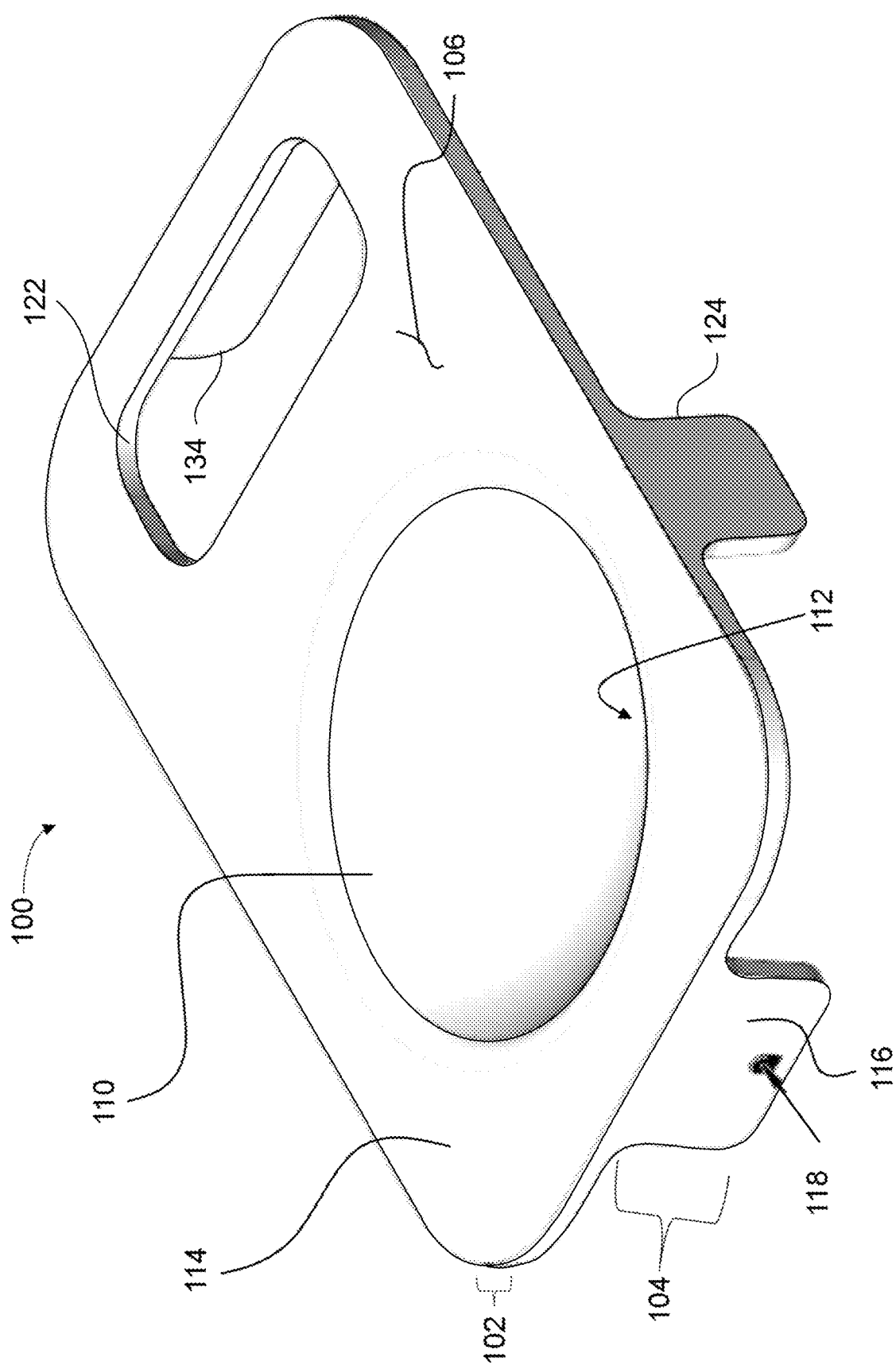
FIG. 1A is a top perspective view of a package for a contact lens.
Figure 1B:
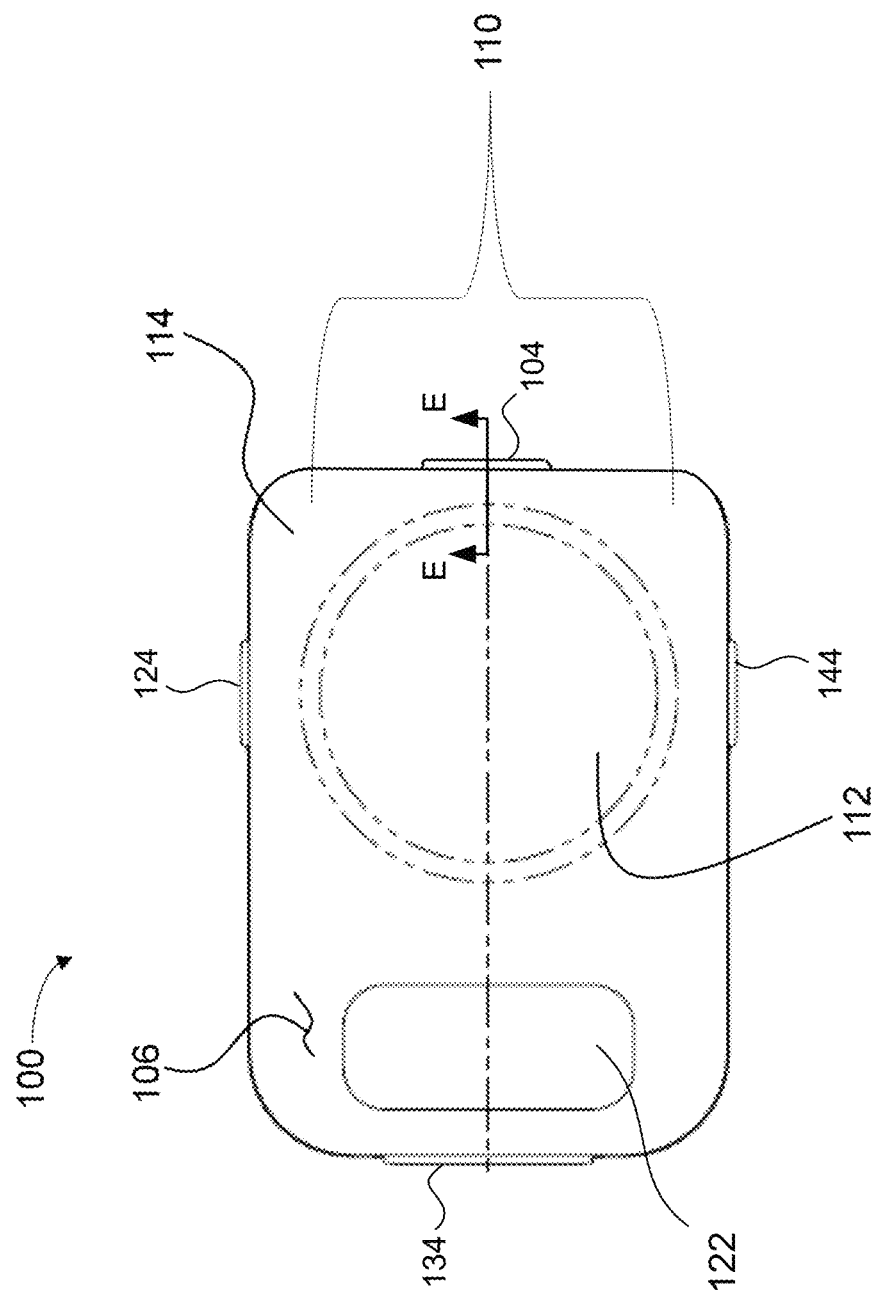
FIG. 1B is a top view of the package of FIG. 1A.
Figure 1C:
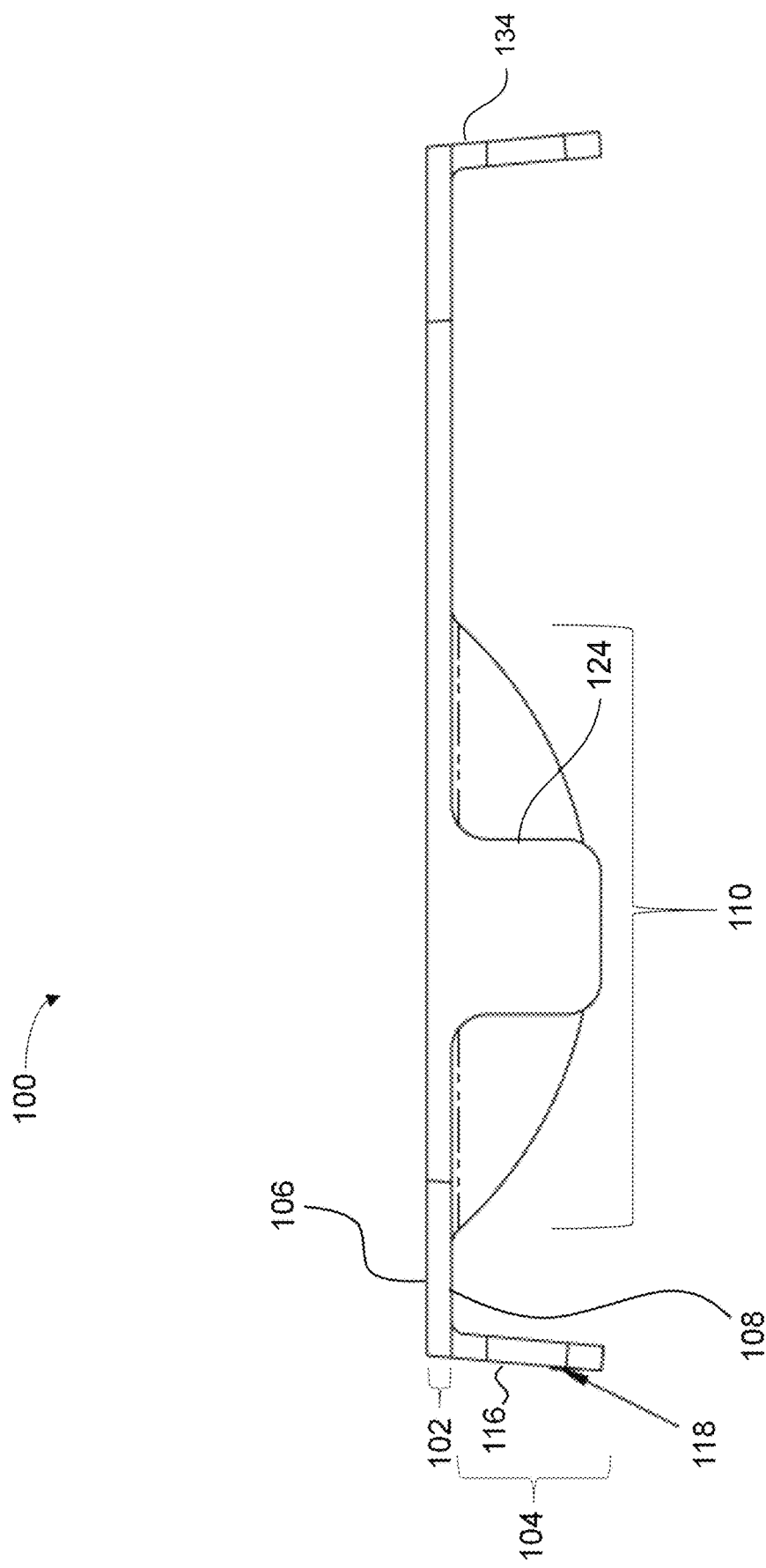
FIG. 1C is a side view of a first side of the package of FIG. 1A.
Figure 1D:
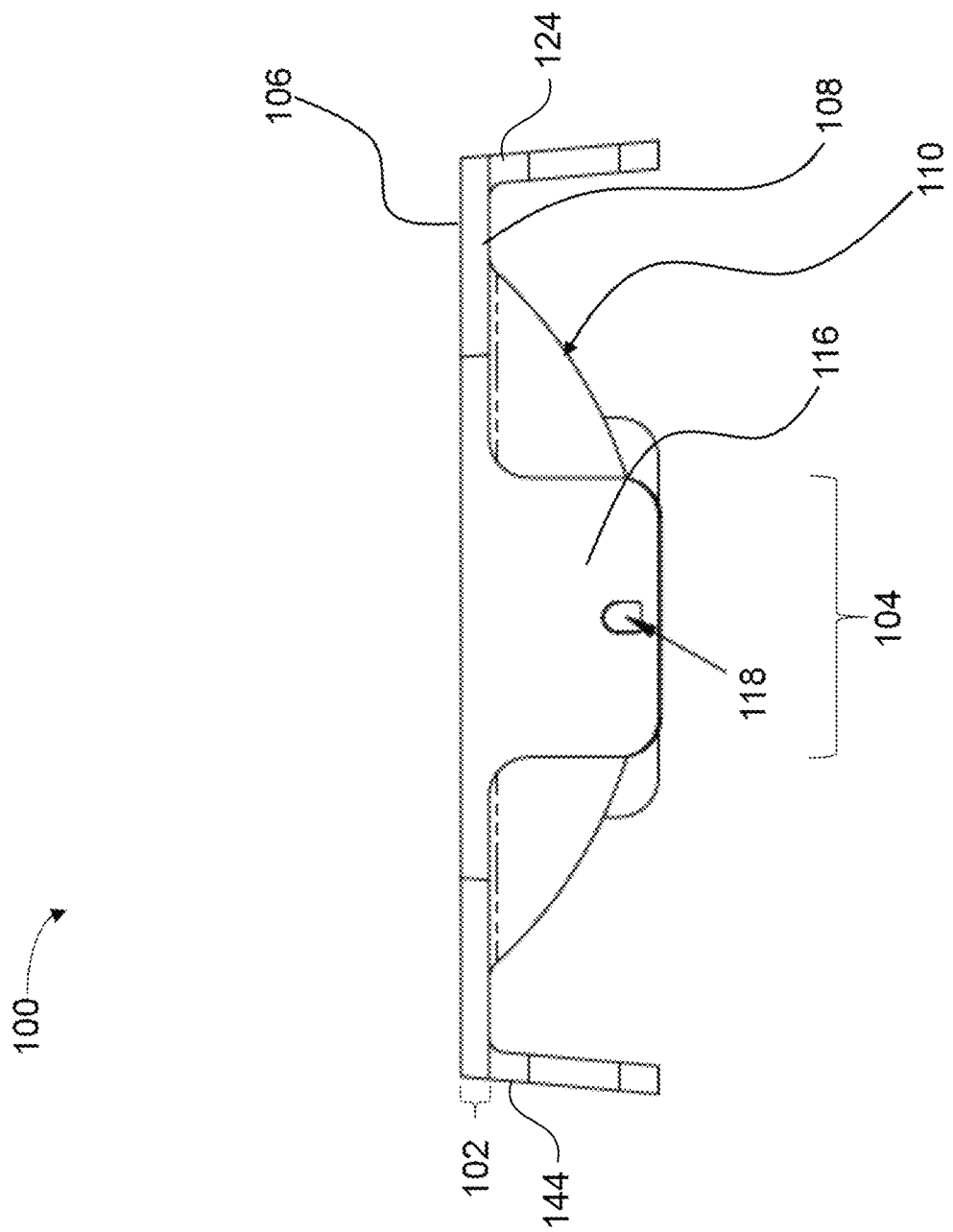
FIG. 1D is a side view of a second side of the package of FIG. 1A.
Figure 2A:
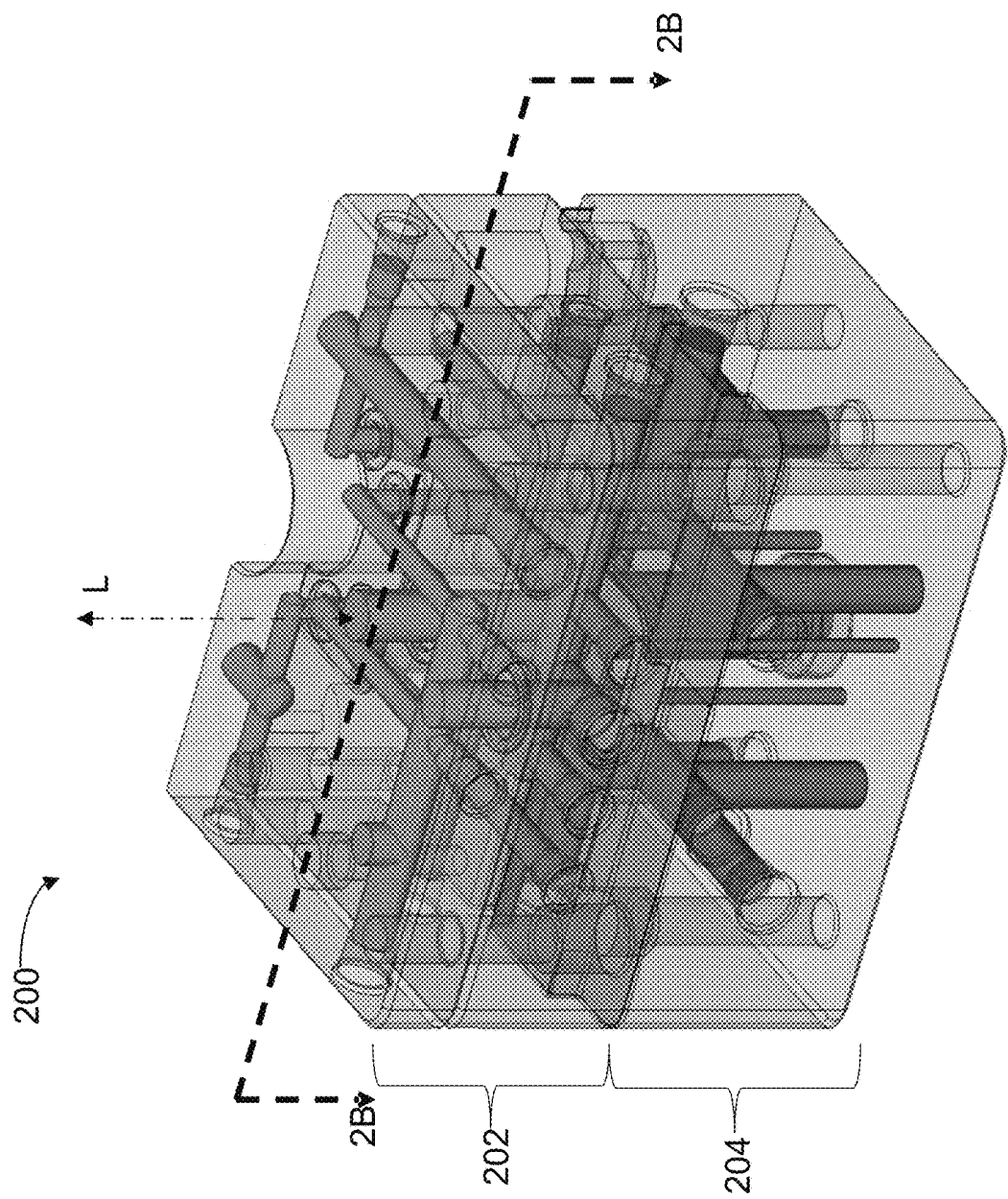
FIG. 2A is a perspective view of a mold for forming the package of FIG. 1A.
Figure 2B:
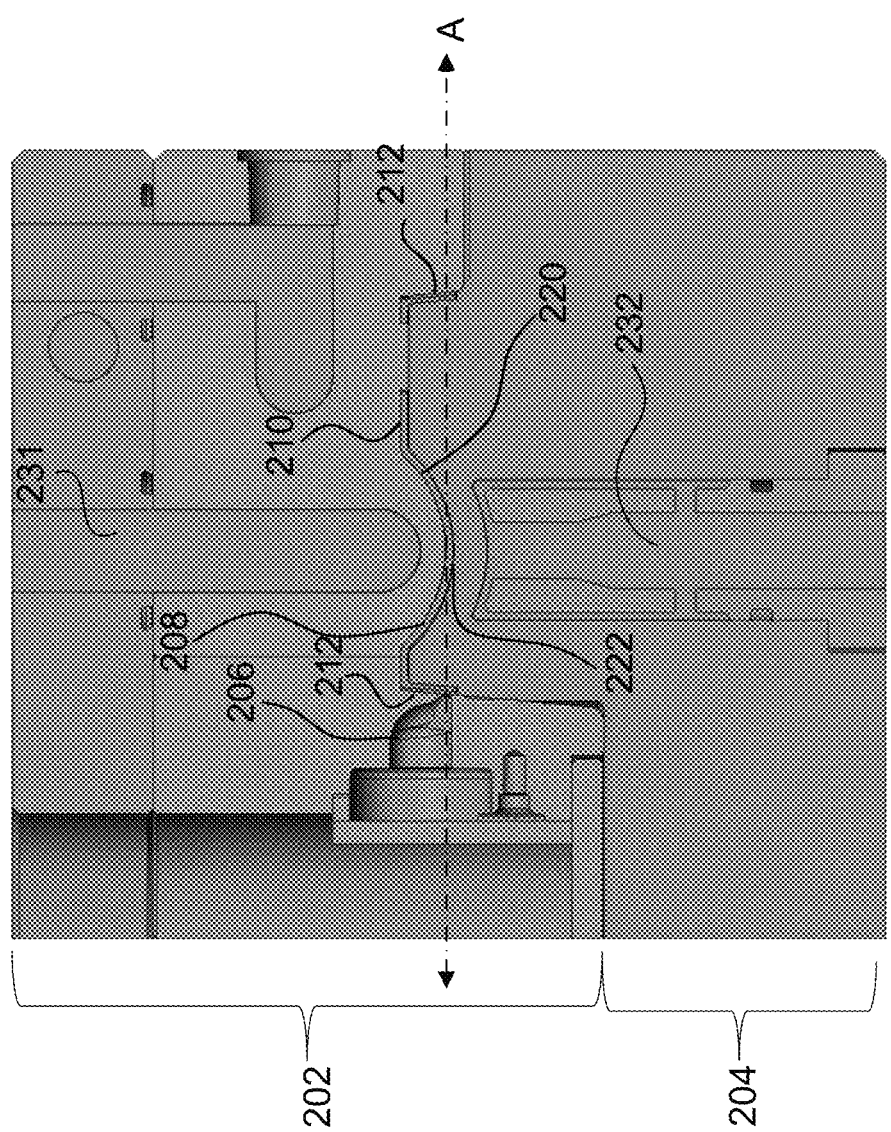
FIG. 2B is a side view of a cross-section of the mold of FIG. 2A, taken at 2B-2B in FIG. 2A, with the package of FIG. 1A shown between a first mold portion and a second mold portion.
Figure 2C:
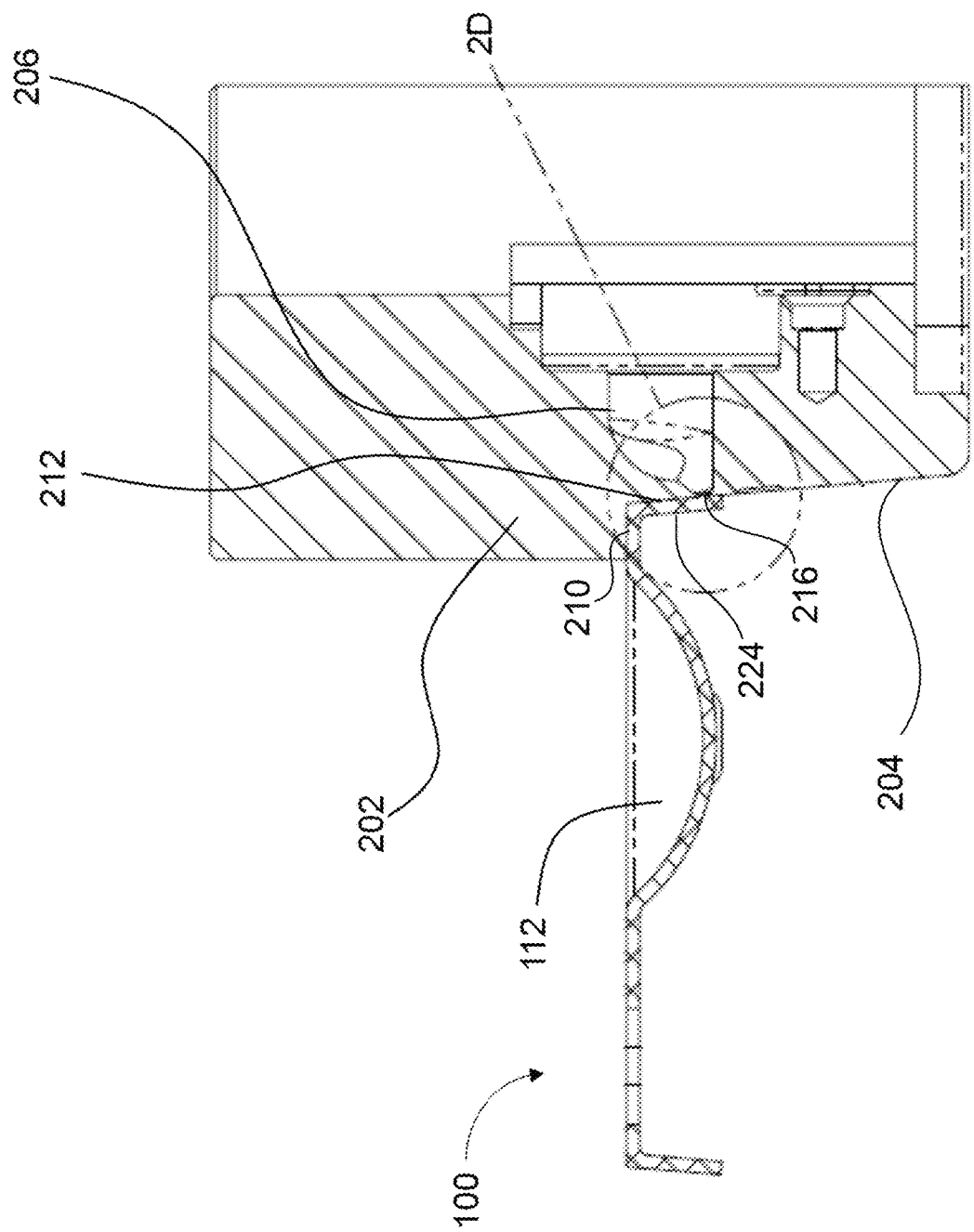
FIG. 2C is a side view of the mold shown in FIG. 2B, shown with sections of the first mold portion and the second mold portion removed to show the package of FIG. 1A.
Figure 2D:
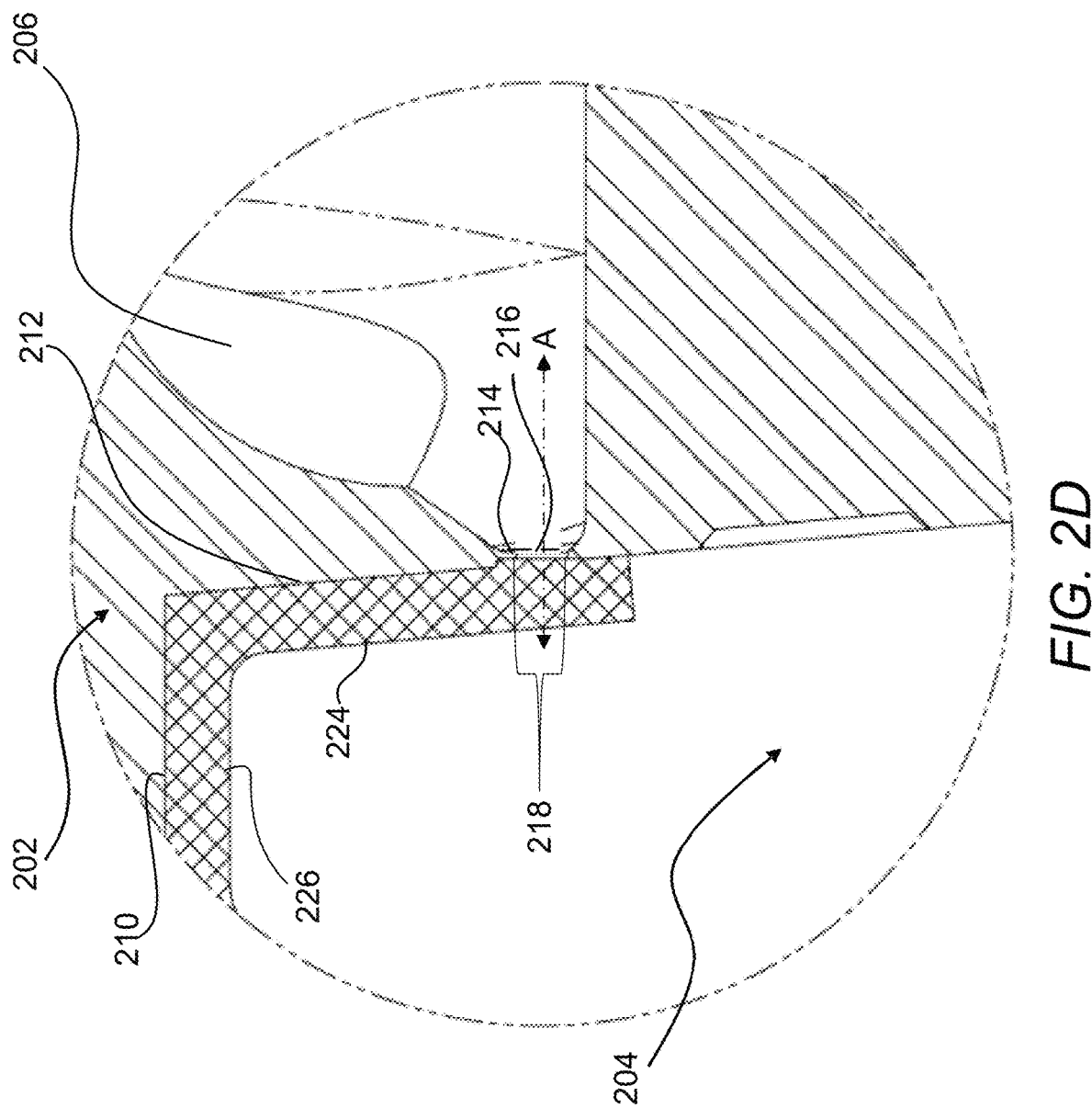
FIG. 2D is an enlarged view of the mold and package of FIG. 2C, taken at the area of detail 2D in FIG. 2C.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the interest of clear and efficient description, terms related to position (e.g., top, bottom, side, vertical, horizontal, and the like) used herein, shall be understood to be relative to a reference orientation of a given package supported on a horizontal surface (e.g., a countertop, a table, etc.) with the rim region facing away from the horizontal surface, unless otherwise specified or made clear from the context. This reference orientation shall also be understood to be the orientation of the packages described herein as these packages are formed in the systems described herein. For example, injection molding material through a side gate shall be generally understood to refer to moving material initially into a mold in a direction transverse (e.g., perpendicular) to a clamping direction of portions of a mold (e.g., the direction of gravity).

As used herein, the term "package" is used to a portion of a blister pack to which a backing (e.g., foil) may be applied to store contact lenses and a fluid (e.g., saline) for shipping and storage. It shall be appreciated, however, that the context of blister packs for contact lenses is used herein for the sake of clear and efficient description. That is, unless otherwise indicated or made clear from the context, any one or more of the packages, systems, and methods described herein shall be understood to refer to a portion of any type of packaging formed or formable through injection molding and including at least one pre-formed plastic portion defining a cavity for containing small consumer goods, foods, health and beauty material, pharmaceuticals, and the like.

In general, as described in greater detail below, systems and/or methods for fabrication of contact lens packages may include injection molding using a side gate to facilitate improved throughput in manufacturing contact lens packages, as compared to fabrication using gating along a horizontal surface (e.g., a top surface) of contact lens packages. Further, or instead, contact lens packaging itself may include one or more structural features useful for accommodating side gating to improve throughput while retaining quality of the contact lens packages, as compared to injection molding through gating along horizontal surface of contact lens packages (e.g., a top surface). For example, as also described in greater detail below, contact lens packages may include one or more walls collectively including at least one draft surface and a wipe surface. As used herein, unless otherwise specified or made clear from the context, a draft surface shall be understood to include a surface with a vertical dimension and having a taper in the vertical dimension such that the draft surface is oblique to a plane defined by a rim region about a reservoir of the contact lens package. Each draft surface may assist with releasing the contact lens package from the mold with a reduced likelihood of unintended deformation, as compared to the releasability of a comparable wall that is perpendicular to a horizontal surface of the contact lens package. Additionally, or alternatively, as used herein, a wipe surface shall be understood include a surface perpendicular to the plane defined by the rim region of the contact lens package, unless otherwise indicated. The wipe surface may be adjacent to an aperture defined by a side gate as the contact lens package is formed in the mold and the orientation of the wipe surface—namely, perpendicular to the plane defined by the rim region of the contact lens package and, thus, perpendicular to a direction of injection into the mold. This orientation of the wipe surface may facilitate, for example, consistent separation of polymer material of the contact lens package from polymer material in the aperture of the side gate as the contact lens package is removed from the mold. Further, as also described in greater detail below, injection molding simulations indicate that while injection molding a contact lens package using gating along a top surface of the contact lens package may be useful for distributing molten polymer quickly within the mold, introducing molten polymer into the mold in this way may slow down the cooling process, as compared to introducing molten polymer into the mold using side gating. In particular, injection molding simulations indicate that this difference has a significant impact on overall cycle time—with injection molding using side gating having simulated cycle times between about 4.0 seconds and 4.5 seconds, as compared to simulated cycle times of about 6.0 seconds for injection molding using gating along a top surface of a contact lens package. Accordingly, contact lens packages, systems, and methods described herein may increase quality, reduce cycle times, and reduce production costs when compared to injection molding contact lens packages using gating along a horizontal surface.

Referring now to FIGS. 1A-1D, a package 100 for a contact lens may include a base 102 and one or more walls 104, 124, 134, 144. The base 102 and the one or more walls 104, 124, 134, 144 may be formed, for example, of at least one polymer (e.g., any one or more of the various different polymers described in the simulations described below) such that the package 100 may be fabricated in large-scale, commercial quantities by injection molding. The base 102 may include a first surface 106 (e.g., top surface, in the orientation shown in FIGS. 1A, 1C, and 1D) and a second surface 108 (e.g., a bottom surface, in the orientation shown in FIGS. 1A, 1C, and 1D). Further, or instead, the first surface 106 and the second surface 108 may form a reservoir 110. The first surface 106 may be concave along the reservoir 110 and define a recess 112, and the second surface 108 may be convex along the reservoir 110. Additionally, or alternatively, the first surface 106 may form a rim region 114 circumscribing the recess 112, with the rim region 114 of the first surface 106 defining a plane.

In general, the one or more walls 104, 124, 134, 144 may collectively include at least one instance of a draft surface 116 and a wipe surface 118. The at least one instances of the draft surface 116 may extend from the base 102 in at least one direction oblique to the plane defined by the rim region 114 of the first surface 106 of the base 102, and the wipe surface 118 may be perpendicular to the plane defined by the rim region 114 of the first surface 106 of the base 102. That is, the at least one instance of the draft surface 116 may be at an angle θ relative to the wipe surface 118. The orientations of the at least on instance of the draft surface 116 and the wipe surface 118 relative to the plane defined by the rim region 114 are structural features of the package 100 associated with injection molding the package 100 according to any one or more of the various, different side-gating techniques described herein. Significantly, as may be appreciated in the injection molding simulations described below, the at least one instance of the draft surface 116 and wipe surface 118 may facilitate injection molding the package 100 with lower cycle times, lower cost, and/or higher throughput, as compared to injection molding a contact lens package without these features, as compared to a contact lens package that is injection molded using gating along a top surface of the package. Stated differently, as compared to a contact lens package formed using gating along a top surface of the package, the at least one instance of the draft surface 116 and the wipe surface 118 may facilitate balancing competing considerations of promoting rapid cooling of the package 100 in the mold using side-gating along the one or more walls 104, 124, 134, 144 while nevertheless achieving consistent and robust separability of the one or more walls 104, 124, 134, 144 from a mold section as the package 100 is removed from the mold at the end of an injection molding cycle.

The one or more walls 104, 124, 134, 144 may each extend away from the base 102, as may be useful for reducing the likelihood of inadvertently tipping the package 100 (and contents of the reservoir 110) when the package 100 is placed on a horizontal surface (e.g., a countertop, a table, etc.). For example, the one or more walls 104, 124, 134, 144 alone, or in combination with the reservoir 110 may be sized to support the plane defined by the rim region 114 of the first surface 106 in a stable orientation with the one or more walls 104, 124, 134, 144 and the reservoir 110 positioned on a horizontal surface (e.g., a countertop, a table, etc.) and the rim region 114 facing away from the horizontal surface (e.g., facing upward). In this context, it shall be appreciated that stable support of the package 100 includes supporting the package 100 on the horizontal surface such that contents of the reservoir 110 (e.g., one or more contact lenses, fluid such as saline, or a combination thereof) remain within the reservoir 110 with little or no external force on the package 100 while the contents of the reservoir 110 are exposed to the environment, thus freeing the user's hands for placing contact lenses in the user's eyes. In certain implementations, the one or more walls 104, 124, 134, 144 may be separate walls, as may be useful for achieving stabilization of the package 100 while reducing the amount of material required to form the package 100, thus reducing thermal mass associated with cooling the package 100 as part of an injection molding cycle.

In certain implementations, at least one of the first surface 106 or the second surface 108 of the base 102 may have a large surface area, as compared to other surfaces of the package 100. For example, the first surface 106 may have a first surface area, the second surface 108 may have a second surface area, and a third surface area may be collectively defined by the wipe surface 118 and the at least one instance of the draft surface 116. Continuing with this example, the third surface area collectively defined by the wipe surface 118 and the at least one instance of the draft surface 116 may be less than at least one of the first surface area of the first surface 106 or the second surface area of the second surface 108. As compared to gating along a top surface of a contact lens package, the relative surface areas of the package 100 may promote forming and rapidly cooling of the package 100 according to any one or more of the various side-gating techniques described herein while using only relatively small features that are discretely positioned away from the largest surfaces of the package 100 (e.g., to facilitate achieving consistent aesthetic appearance across multiple instances of the package 100, to reduce the likelihood of interfering with user interaction with the package 100, etc.).

While the wipe surface 118 and the at least one instance of the draft surface 116 may generally have any orientation relative to one or more features of the base 102, the wipe surface 118 and the at least one instance of the draft surface 116 may be oriented away from certain features of the base 102. For example, the wipe surface 118 and the at least one instance of the draft surface 116 may each face away from the reservoir 110. This may be useful for reducing cooling time of the package 100, ultimately reducing injection molding cycle time of the package 100, as described in greater detail below. That is, the position of the wipe surface 118 and the at least one instance of the draft surface 116 may generally dictate relative position of components of an injection molding machine. Thus, with the wipe surface 118 and the at least one instance of the draft surface 116 each facing away from the reservoir 110, an injection nozzle used to inject molten plastic into the mold may be positioned away from the reservoir 110 and, thus, away from much of the thermal mass of the package 100 as the package 100 is cooled in the mold. In certain instances, the wipe surface 118 may additionally, or alternatively, be spaced apart from each one of the first surface 106 and the second surface 108 of the base 102. For example, such spacing may be useful for positioning an injection nozzle away from the large thermal mass of the material forming the base 102. Further, or instead, to the extent the wipe surface 118 is associated with separating the injection nozzle from the package 100 as the package 100 is removed from a mold, spacing the wipe surface 118 away from the first surface 106 and the second surface 108 of the base 102 may reduce the likelihood of the wipe surface 118 changing aesthetic appearance and/or functional characteristics of the package 100, as compared to contact lens packages formed using gating along the top surface.

While the at least one instance of the draft surface 116 and the wipe surface 118 are shown as being surfaces of the first wall 104, it shall be appreciated that this is for the sake of clear and efficient description and should not be considered limiting, unless otherwise specified or made clear from the context. Thus, for example, the at least one instance of the draft surface 116 and the wipe surface 118 may be surfaces on a different wall, such as one or more of the second wall 124, the third wall 134, or the fourth wall 144. In this way, at least an upper portion of the wipe surface 118 may protrude slightly from the draft surface 116, thus forming an upper ridge 128. Additionally, or alternatively, while the at least one instance of the draft surface 116 and the wipe surface 118 may be surfaces of the same wall, it shall be appreciated that the at least one instance of the draft surface 116 and the wipe surface 118 may be surfaces of different instances of the one or more walls 104, 124, 134, 144.

In general, the base 102 may be graspable by a user to facilitate manipulation of the package 100, for example as the user places the package 100 on a horizontal surface and/or removes a contact lens from the reservoir 110 of the base 102. In certain implementations, the base 102 may define an orifice 122 extending through the base 102 from the first surface 106 to the second surface 108, as may be useful for decreasing overall amount of material required for fabricating the package 100, for providing a graspable area for the user, and/or for reducing thermal mass required for cooling the package 100 during an injection molding cycle, as compared to a contact lens package without the orifice. For example, along the plane defined by the rim region 114 of the first surface 106 of the base 102, the recess 112 of the reservoir 110 may be between the orifice 122 and at least one of the first wall 104, the second wall 124, the third wall 134, and the fourth wall 144, as may be useful for providing the user with graspable features on either side of the reservoir 110 to facilitate removing foil or other covering material from the first surface 106 to expose the reservoir 110 and its contents (e.g., one or more contact lenses in saline) and additionally, or alternatively, facilitating delicately removing contact lenses from the reservoir 110. Additionally, or alternatively, along the plane defined by the rim region 114 of the first surface of the base 102, the recess 112 may have a first area along the plane, the orifice 122 may have a second area along the plane, and the first area may be greater than the second area. Such relative sizing of areas may be useful, for example, for facilitating the flow of molten plastic to form the base 102 as the package 100 is formed according to any one or more of the various, different injection molding techniques described herein. Further, or instead, such relative sizing of areas of the recess 112 and the orifice 122 in the plane defined by the rim region 114 may facilitate forming the package 100 with features that resist cracking or other deformation as the package 100 is subject to forces associated with placing and sealing a contact lens and saline in the reservoir 110, placing a cover over the reservoir 110, and subsequently removing the cover.

The reservoir 110 may be shaped to contain at least one contact lens and an amount of saline solution. As an example, the reservoir 110 may have a curvilinear two-dimensional profile perpendicular to the plane defined by the rim region 114 of the first surface 106. As compared to other types of profiles, such a curvilinear two-dimensional profile may facilitate removing contact lens from the reservoir 110 with little or no damage to the contact lens. For example, a user may push the contact lens along the reservoir 110 to remove the contact lens from the reservoir. As compared to reservoir shapes with sharp edges, the curvilinear two-dimensional profile of the reservoir 110 may be less likely to tear or otherwise damage the contact lens as the contact lens is pushed along the reservoir 110.

Having described various aspects of the package 100 including features (such as at least one instance of the draft surface 116 and the wipe surface 118) facilitating injection molding the package 100 using side-gating, attention is now directed to describing aspects of a system for injection molding the package 100 using side-gating.

Referring now to FIGS. 2A-2E, a system 200 for fabricating a package for a contact lens may include a first mold portion 202, a second mold portion 204, and a nozzle 206. The second mold portion 204 may be releasably engageable with the first mold portion 202 to define a cavity 220 therebetween, with the cavity 220 having the shape of a package to be formed (e.g., the package 100 in FIG. 1A). For example, the first mold portion 202 may include a convex section 208, a planar section 210 circumscribing the convex section 208, at least one instance of the draft section 212 extending oblique to the planar section 210, and a wipe section 214 defining a side gate 216 having an aperture 218 in a plane perpendicular to the planar section 210. In certain implementations, the convex section 208 may have a curvilinear two-dimensional profile perpendicular to the planar section 210 of the first mold portion 202, such as may be useful for forming a corresponding reservoir with a curvilinear profile useful for containing a contact lens or other delicate material. The wipe section 214 may, for example, extend from the at least one instance of the draft section 212 and/or may be spaced away from the planar section 210 of the first mold portion 202. The second mold portion 204 may define a concave section 222 opposite the convex section 208 of the first mold portion 202 along the cavity 220 defined by the first mold portion 202 and the second mold portion 204 releasably engaged with one another. The nozzle 206 may be in fluid communication with the cavity 220 at the aperture 218 of the side gate 216 defined by the wipe section 214.

In use, as described in greater detail below, the system 200 may direct molten plastic from the nozzle 206 into the cavity 220 via the aperture 218 of the side gate 216, the molten plastic may cool in the cavity 220 to form a package in the shape of the cavity 220—namely a package including one or more walls collectively having at least one instance of a draft surface and a wipe surface, as described herein. The first mold portion 202 and the second mold portion 204 may be separated from one another (e.g., along an axis L) to release the package after the package has been cooled in the cavity 220. In particular, as the first mold portion 202 and the second mold portion 204 are separated from one another in a direction perpendicular to the planar section 210 of the first mold portion 202, the cooled plastic forming the package 100 in the cavity may shear from plastic in the aperture 218 of the side gate 216 such that the package 100 may be removed from the first mold portion 202 and the second mold portion 204. While the system 200 may be used for injection molding the package 100, it shall be more generally understood that the system 200 may be used for injection molding any type of package having at least a reservoir for containing material, as well as at least one draft surface and a wipe surface to facilitate injection molding using side-gating as described herein.

In certain implementations, the first mold portion 202 may define a first cooling circuit 231 and the second mold portion 204 may define a second cooling circuit 232 to facilitate cooling the molten plastic in the cavity 220 to form a package. Continuing with this example, the side gate 216 may define an axis A extending between the first cooling circuit 231 and the second cooling circuit 232 without intersecting either one of the first cooling circuit 231 or the second cooling circuit 232, as may be useful facilitating the use of side-gating without interfering with cooling of either of the first mold portion 202 or the second mold portion 204 as the first mold portion 202 and the second mold portion 204 move relative to one another during an injection molding cycle corresponding to formation of the package 100. In certain implementations, at least a portion of the first cooling circuit 231 and/or at least a portion of the second cooling circuit 232 may be adjacent to respective portions of the cavity 220 corresponding to features of the package 100 that are slower to cool than other portions of the package 100. For example, because of its shape, the recess 112 of the package 100 may be challenging to cool as compared to flat sections of the package 100. Stated differently, the recess 112 of the package 100 may represent a lower limit of the time required to cool the package 100 before the package 100 can be removed from the cavity 220. Thus, to facilitate faster cooling as compared to cooling without cooling circuits or as compared to cooling circuits with different shapes, at least a portion of the first cooling circuit 231 may be adjacent to the concave section 222 of the first mold portion 202 and additionally, or alternatively, at least a portion of the second cooling circuit 232 may be adjacent to the convex section 208 of the second mold portion 204.

Figure 3:
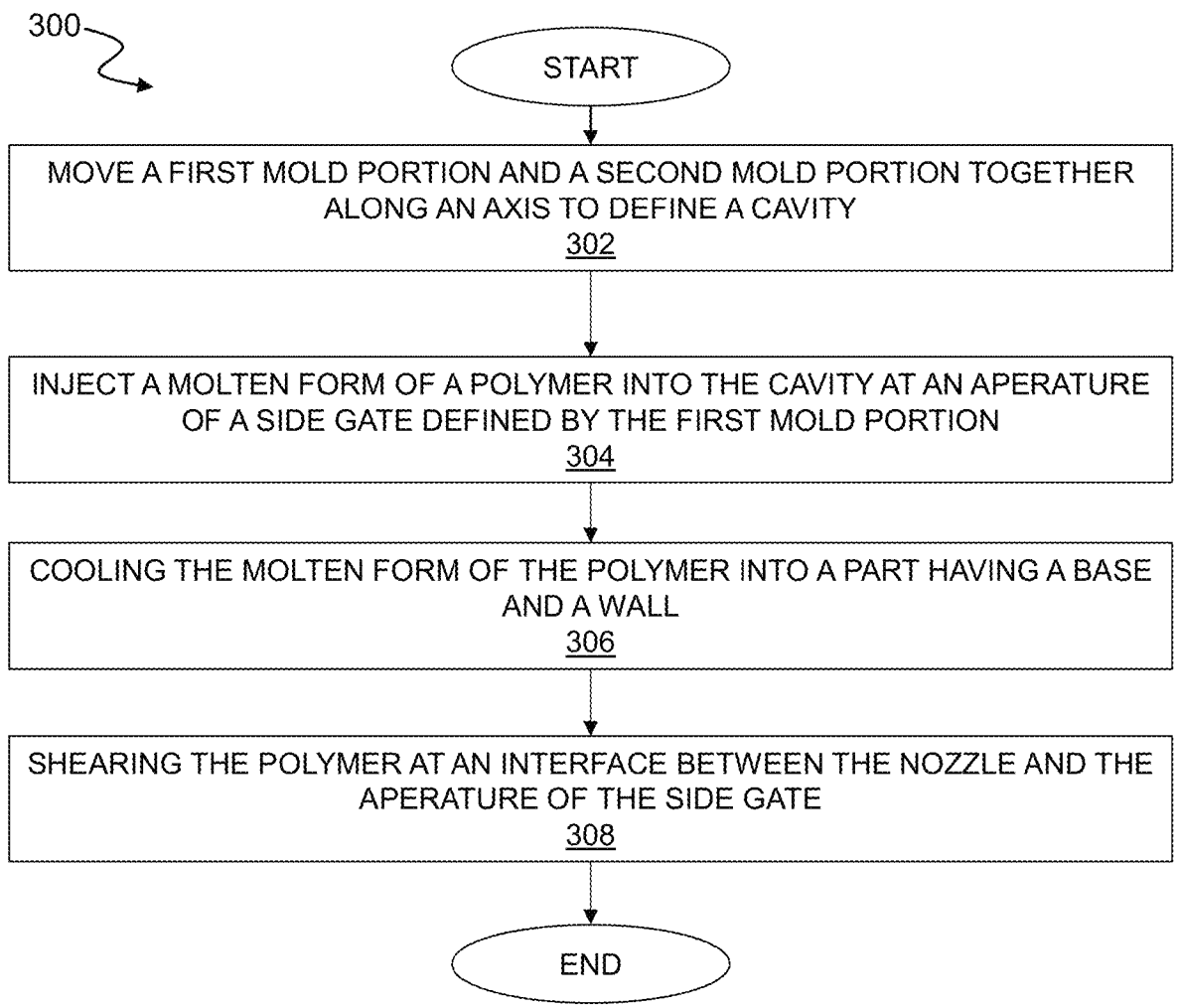
FIG. 3 is a flow chart of an exemplary method of fabricating a package for a contact lens.

FIG. 3 is a flow chart of an exemplary method 300 of fabricating a package for storing a contact lens and saline in a blister pack. Unless otherwise specified or made clear from the context, the exemplary method 300 shall be understood to be carried out using the system 200 (FIGS. 2A-2D) to form a package, such as the package 100 (FIGS. 1A-1E).

As shown in step 302, the exemplary method 300 may include moving a first mold portion and a second mold portion together along an axis to define a cavity.

As shown in step 304, the exemplary method 300 may include injecting a molten form of a polymer from a nozzle into the cavity through an aperture of a side gate defined by the first mold portion. For example, injecting the molten form of the polymer may include heating the polymer above a melt temperature of the polymer above a temperature of about 250° C.

As shown in step 306, the exemplary method 300 may include, in the cavity, cooling the molten form of the injected polymer into a part having a base and a wall, the base having a rim region and a reservoir, the reservoir circumscribed by the rim region, and the wall extending away from the base in at least one direction oblique to a planar extent of the rim region. For example, cooling the molten form of the polymer may include cooling the first mold portion with a first liquid coolant moving through a first cooling circuit and cooling the second mold portion with a second liquid coolant moving through a second cooling circuit. As a more specific example, the molten form of the polymer may be injected into the cavity between the first cooling circuit and the second cooling circuit.

As shown in step 308, the exemplary method may include, in a direction parallel to the axis, shearing the polymer at least at an interface between the nozzle and the aperture of the side gate. For example, shearing the polymer may include moving the first mold portion and the second mold portion away from each other along the axis.

Having described various aspects of packages, systems, and methods generally directed to the use of side gating in injection molding to form packaging for contact lenses, attention is now directed to injection molding simulation results to provide an indication of the cooling advantages associated with side gating as compared to valve gating along a top surface of a package.

Injection Molding Simulation Results

To assess the potential cooling enhancement realizable by side-gating, simulations of 3D flow of molten polymer to form packages for contact lens blister packs were performed. Injection molding process simulation software available from SIGMASOFT® Virtual Molding of Schaumburg, Illinois, United States. For each simulation discussed below, the simulated resin was polypropylene homopolymer (Flint Hills P4G4T-017A) having a melt index (g/10 min) of 12.0, a melt temperature of 480° F. (about 250° C.), a solidification temperature of 265° F. (about 130° C.). For each simulated cycle, an ejection temperature of 210° F. (about 99° C.) and a coolant temperature of 80° F. (about 27° C.) was used.

Each simulation described herein was performed with as a 6 second cycle having the following breakdown of cycle phases: open (1.5 sec); eject (0.5 sec); close (1.0 sec); fill (0.4 sec); hold (1.5 sec); cool (1.1 sec). In the "close" phase, the mold is closed from an open position just after the last fabricated package was ejected. In the "fill" phase, a polymer that has been heated to a molten state is injected into a cavity defined by the mold. In the "hold" phase, the polymer is held at pressure equilibrium in the cavity until gate freeze occurs. In the "cool" phase, the polymer in the cavity is allowed to cool (e.g., as heat is carried away by a first cooling circuit in the first mold portion and a second cooling circuit in the second mold portion). In the "open" phase, the mold is opened from the closed position. In the "eject" phase, the "Eject" phase, the package formed from the cooled polymer is ejected from the mold. After the eject phase, the cycle may repeat—starting again at the close phase—to form another package. That is, the cycle may be repeated as necessary to form the package in quantity. In the simulations discussed below, the simulated cycle was repeated until steady-state was reached (corresponding to the 21st simulated cycle following heating-up).

Three different injection molding simulations for packages for contact lens blister packs were performed: i) package injection molded using side gating and conventional cooling; ii) package injection molded using valve gating and conventional cooling; and iii) package injection molded using valve gating and conformal cooling configuration.

Each of these simulation results are described in the respective sections below. These simulations are believed to provide reliable estimates for volume, pressure, and temperature of each molded package and, importantly, are useful for assessing relative performance of the injection molding techniques relative to one another.

i. Package Injection Molded Using Side Gating and Conventional Cooling

Figure 4:
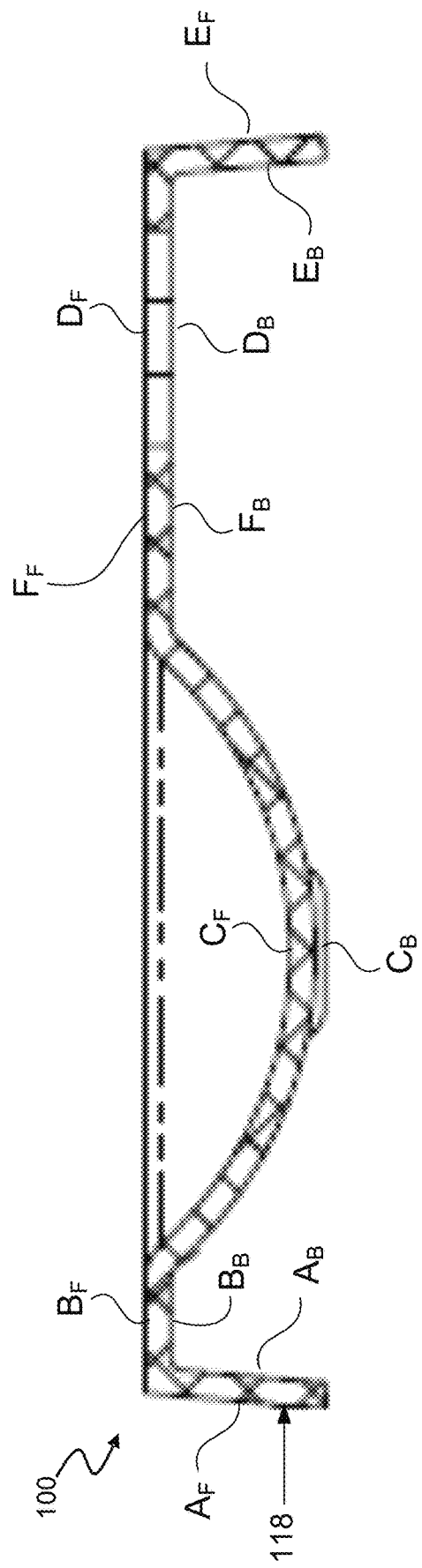
FIG. 4 is a side view of a cross-section of the package of FIG. 1A, with locations of virtual thermocouples used for simulating injection molding of the package of FIG. 1A shown along various front side and back side surface regions of the package of FIG. 1A.

FIG. 4 is a side view of a cross-section of the package 100 (FIG. 1A), with locations of virtual thermocouples used for simulating injection molding of the package 100 (FIG. 1A) shown along various front side and back side surface regions of the package 100 (FIG. 1A). Locations of virtual thermocouples on sides of the package 100 facing a first mold portion (e.g., the first mold portion 202, shown in FIG. 2B) are denoted with the subscript "F," and are generally referred to as the top or front of the package 100. Locations of virtual thermocouples on sides of the package 100 facing a second mold portion (e.g., the second mold portion 204, shown in FIG. 2B) are denoted with the subscript "B," and are generally referred to as the bottom or back of the package 100. For this simulation, injection molding was carried out using the system 200 (FIGS. 2A-2D) to form the package 100 by injection molding the polymer into the cavity 220 (FIG. 2B) via the aperture 218 defined by the side gate 216.

Figure 5A:
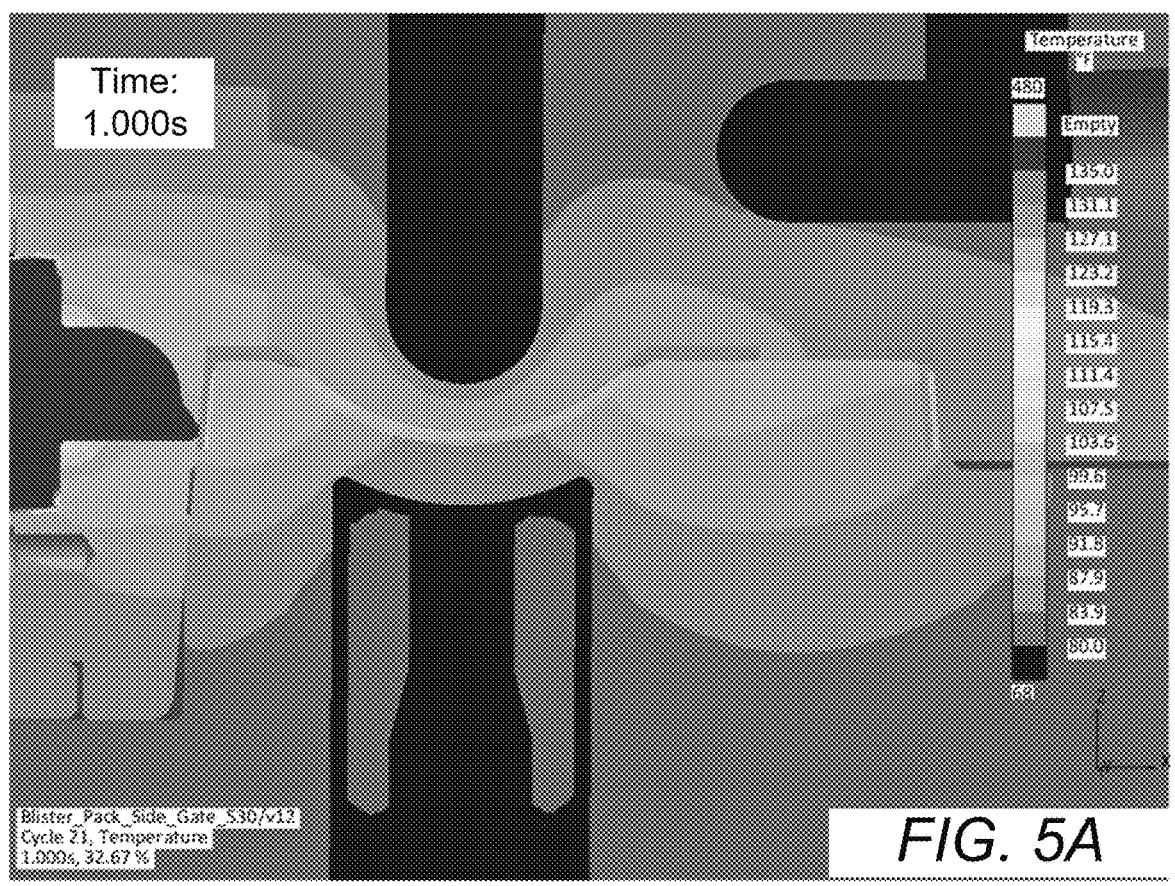
FIGS. 5A-5I are graphical representations of simulated temperature distributions on surfaces of the package of FIG. 1A at various times during a simulated injection molding cycle for forming the package of FIG. 1A using side-gating and conventional cooling.
Figure 5B:
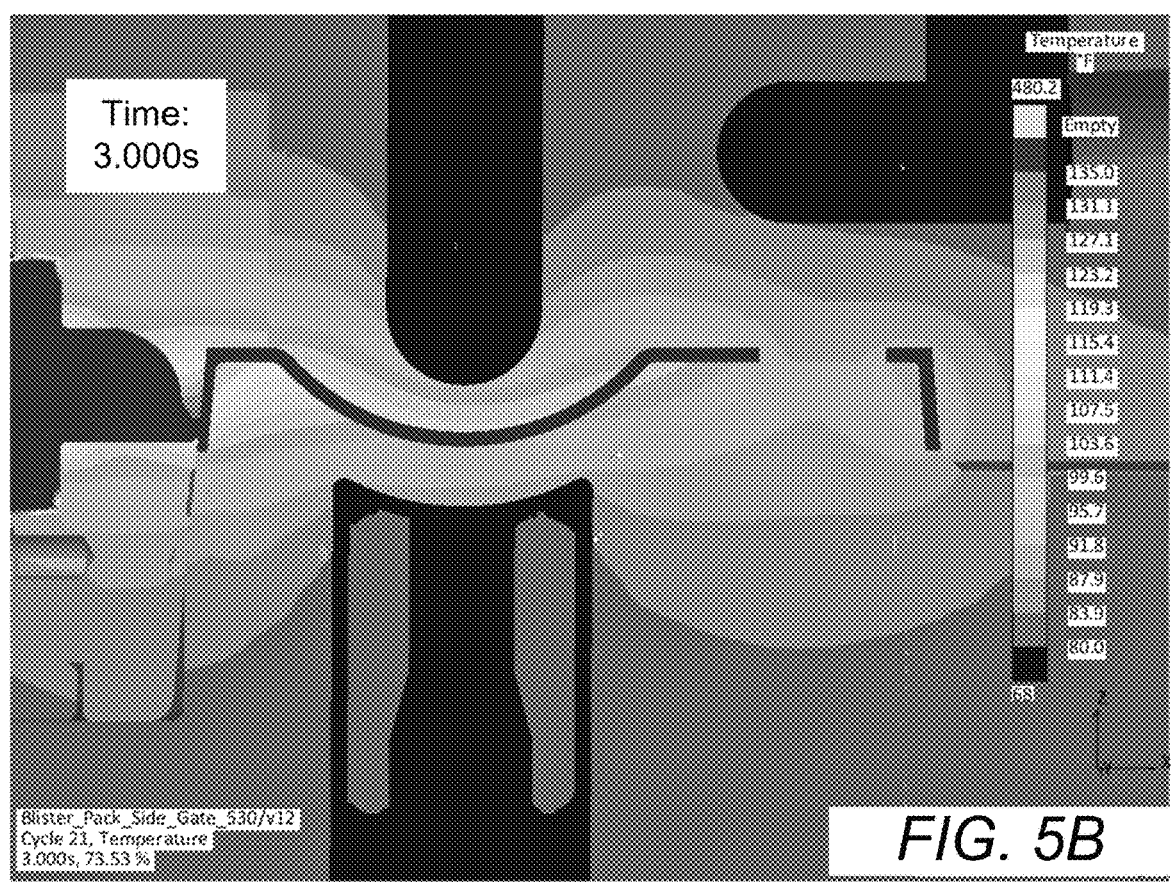
Figure 5C:
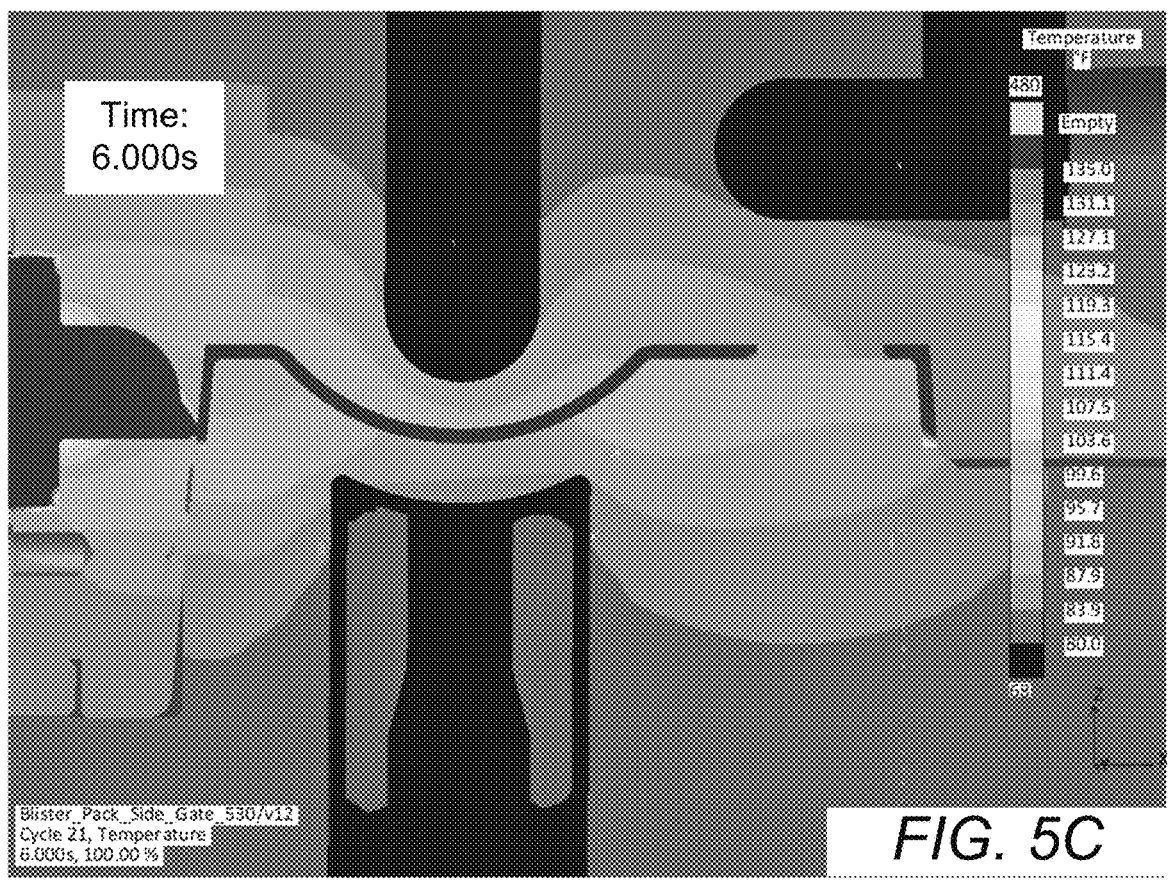
Figure 5D:
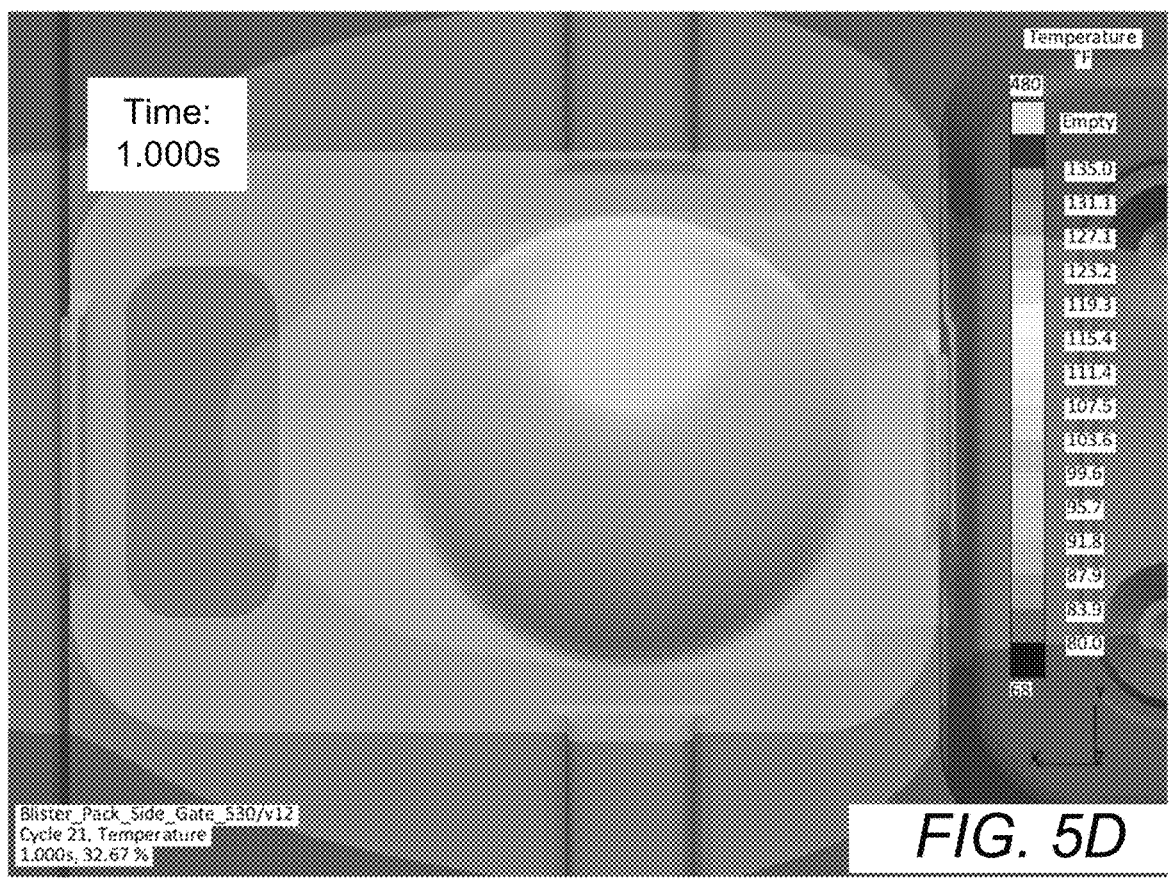
Figure 5E:
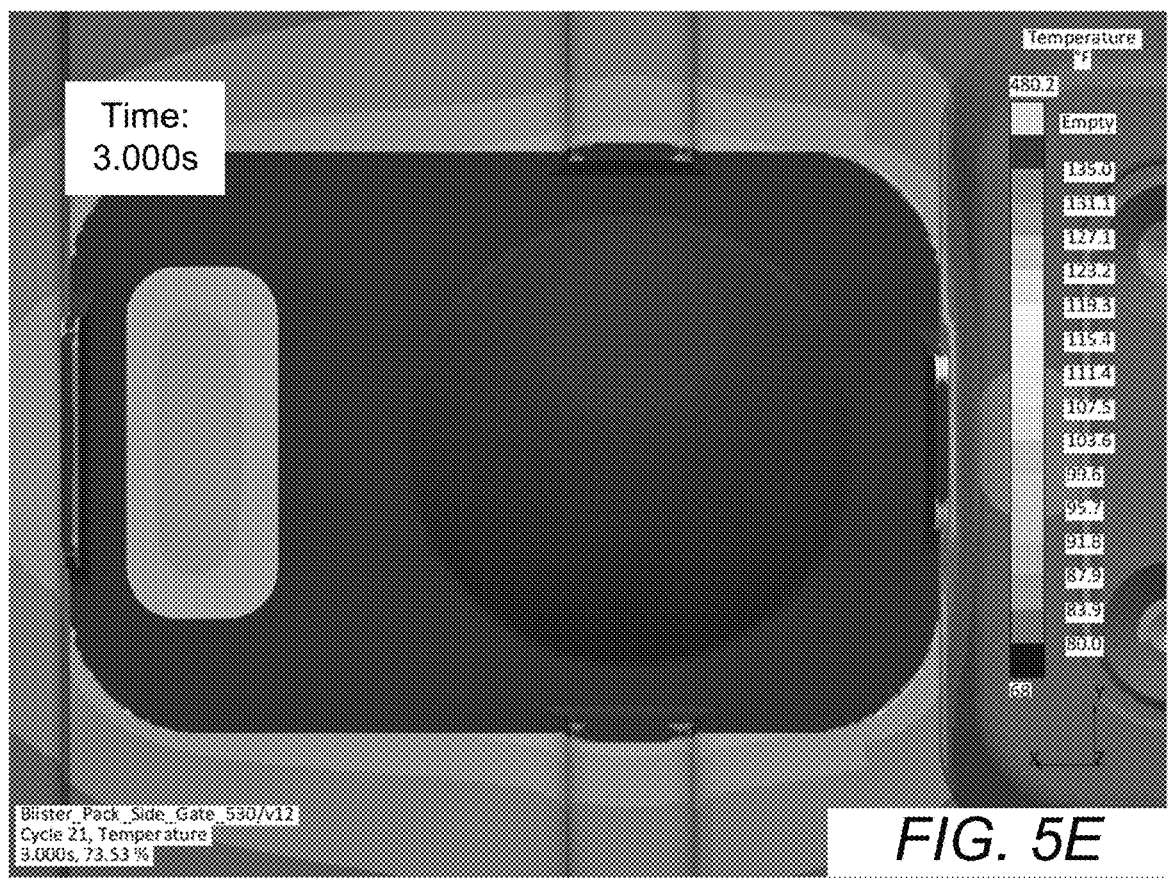
Figure 5F:
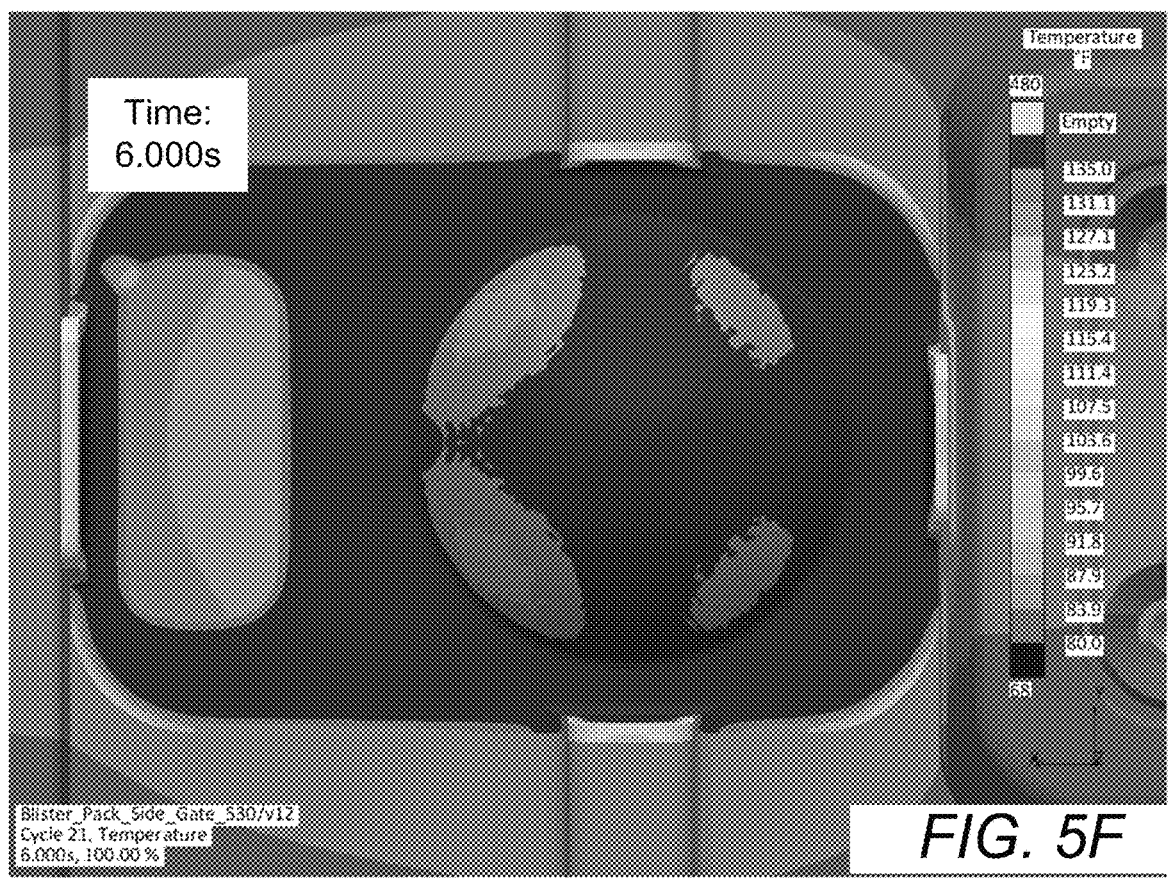
Figure 5G:
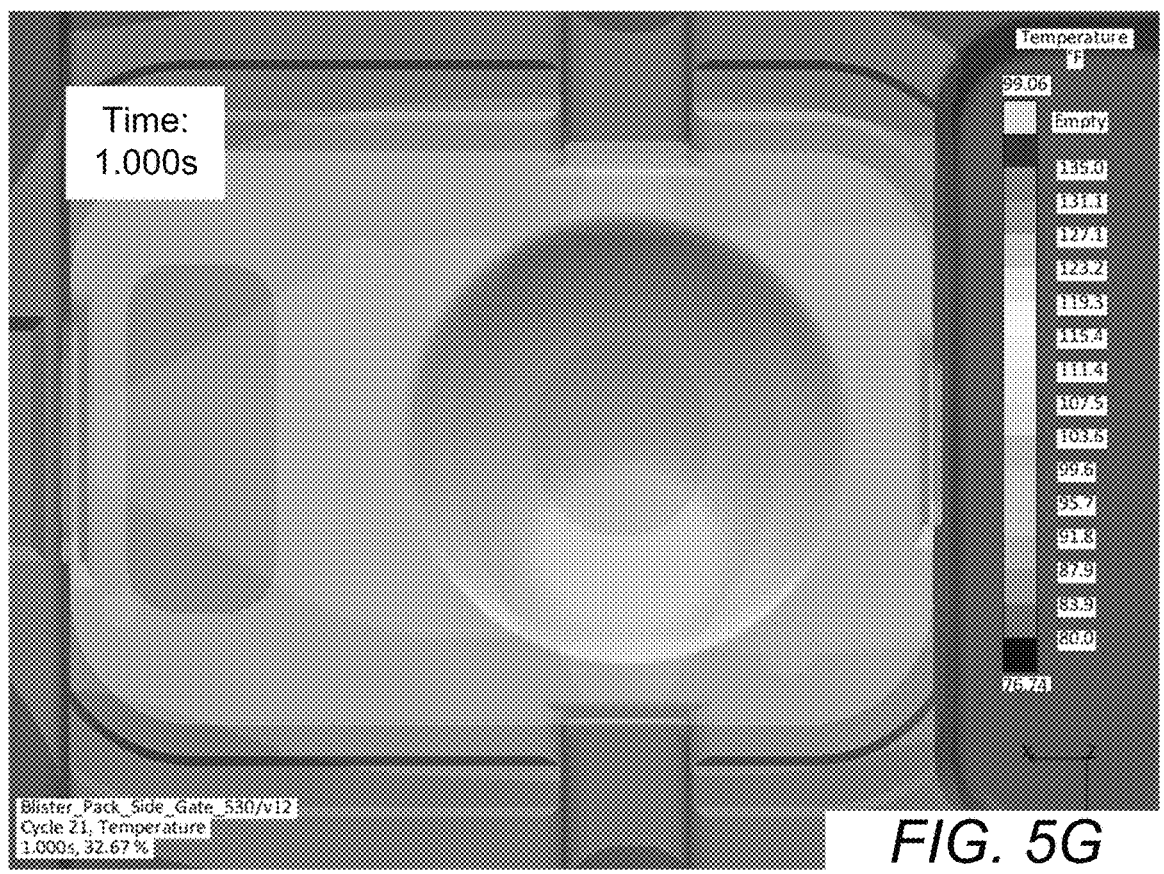
Figure 5H:
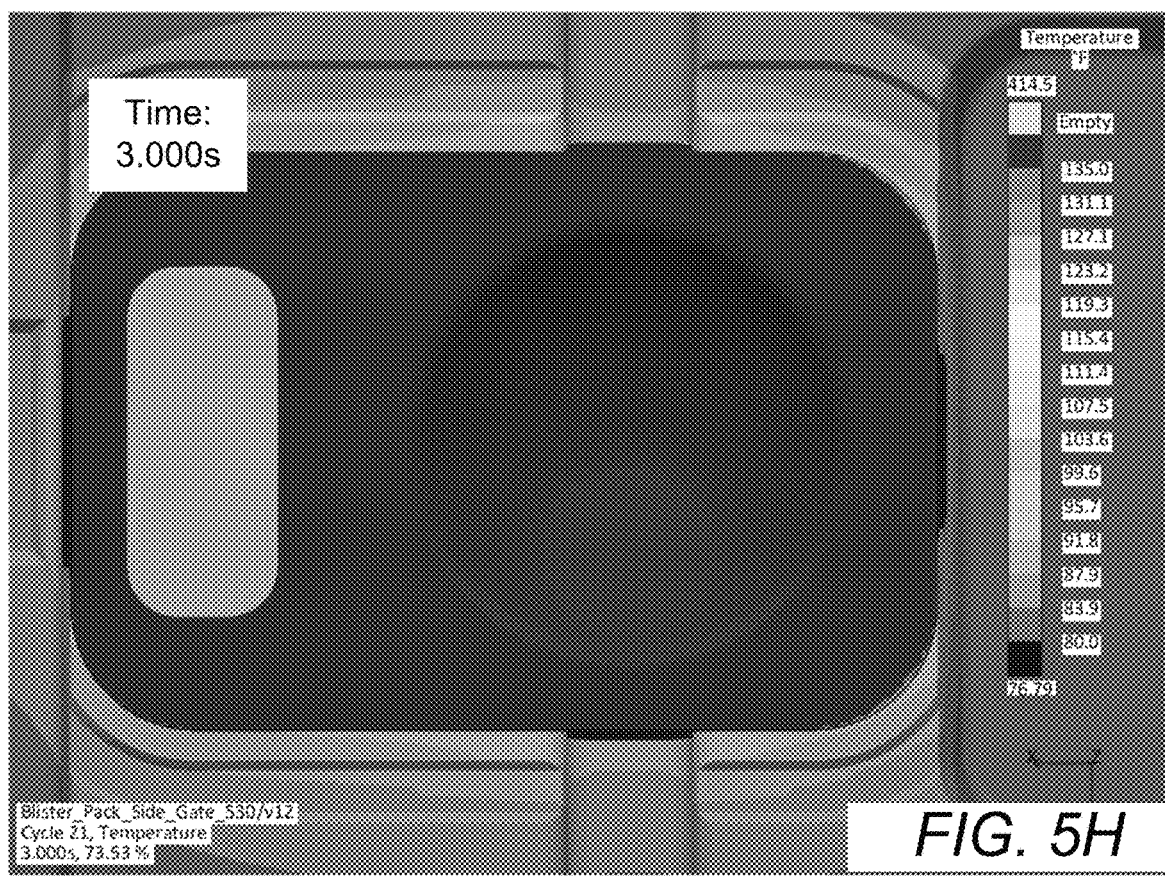
Figure 5I:
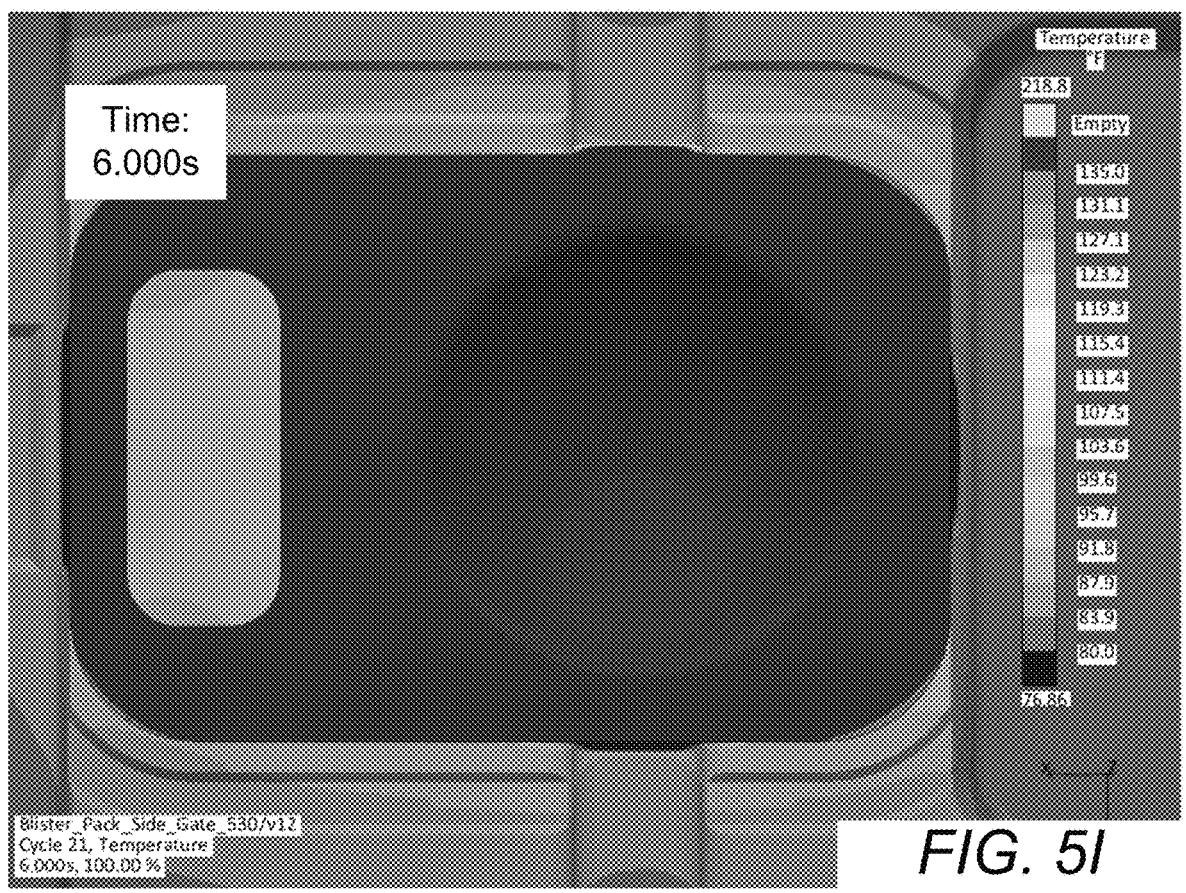

FIGS. 5A-5I illustrate temperature variations of the polymer in the cavity of the mold at different times during a single instance of the 6.0 second molding cycle described above. FIGS. 5A-5C illustrate temperature gradients across a cross-sectional side view of the package 100 shown in FIGS. 4, at 1.000, 3.000, and 6.000 seconds, respectively, after the beginning of the simulated injection molding cycle. FIGS. 5D-5F illustrate temperature gradients corresponding to a bottom view (plan view of surfaces denoted with the subscript "B" in FIG. 4) of the package 100, at the 1.000, 3.000, and 6.000 seconds, respectively, after the beginning of the simulated injection molding cycle. FIGS. 5G-5I illustrate temperature gradients corresponding to a top view (plan view of surface denoted with the subscript "F" in FIG. 4) of the package 100, at the 1.000, 3.000, and 6.000 seconds, respectively, after the beginning of the simulated injection molding cycle.

FIG. 5J is a graph of temperature at the virtual thermocouple locations indicated in FIG. 4, shown varying over the simulated injection molding cycle. The temperature differentials between the front (F) and back (B) of the package at any given region (e.g., A, B, C, D, or E) provide a strong indicator of how stable that region is at a given time in the molding cycle. The greater the differential or the more unevenly the top and bottom surfaces cool, the greater the likelihood that the package may warp and/or deform in that region, which may lead to surfaces not being flat as intended.

Figure 6A:
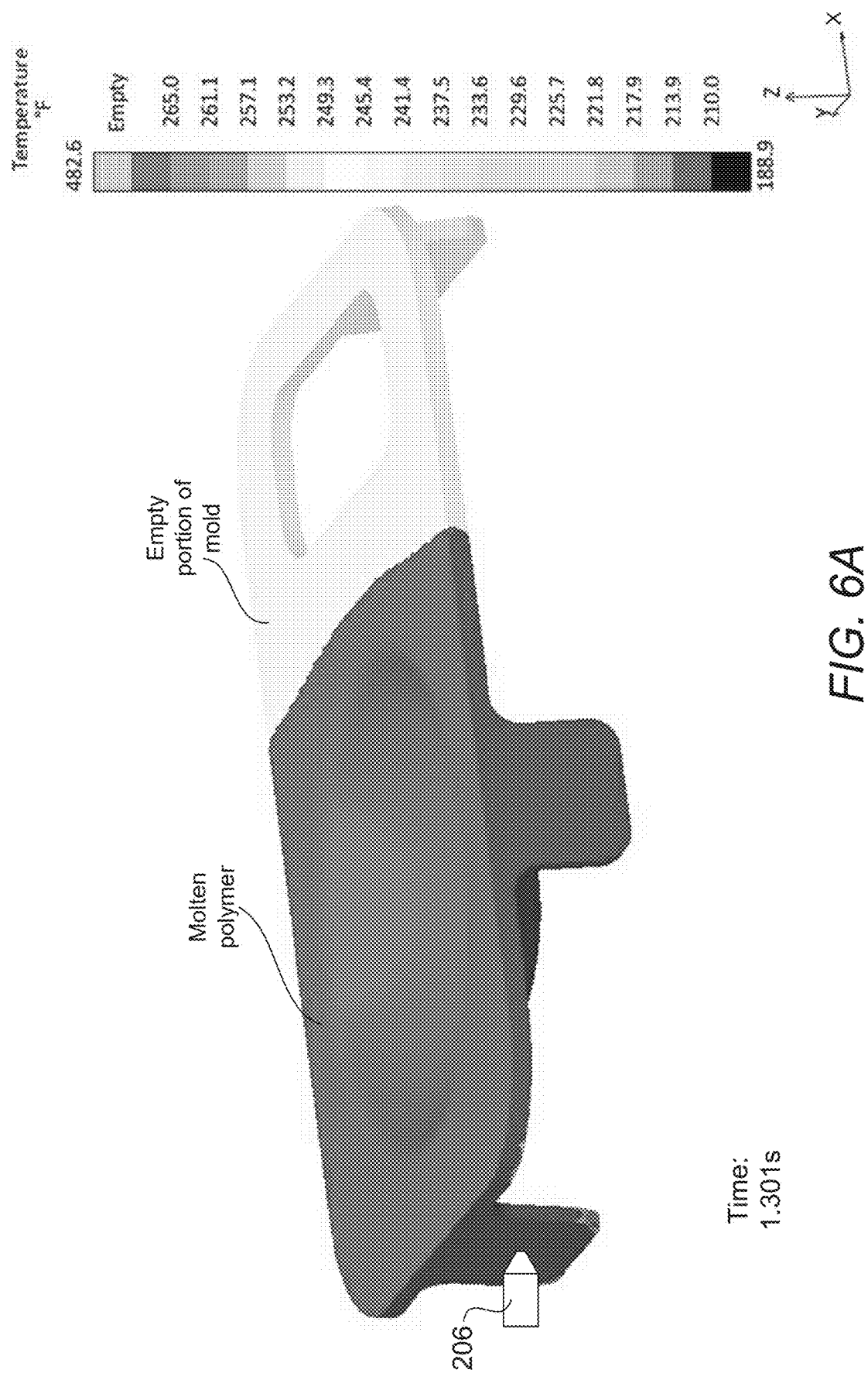
FIGS. 6A-6D are graphical representations of simulated temperature on a perspective view of the package of FIG. 1A, with the graphical representations showing simulated temperature distributions on surfaces of the package at various times during the simulated injection molding cycle.

FIGS. 6A-6D illustrate graphical representations of a perspective view of the cavity 220 of the system 200 (shown in FIGS. 2A-2D), shown without the surrounding mold, as the cavity 220 is filled with molten polymer during the simulated injection molding cycle. In particular, simulated temperature distributions are illustrated on outer surfaces of the molding cavity is it gets filled and the polymer therein cools. FIG. 6A, which corresponds to 1.301 second after the beginning of the simulated injection molding cycle, shows a moment during the fill phase, so the cavity is not yet filled with the polymer. During the simulated injection molding cycle, the molten polymer was injected into the cavity from the nozzle (e.g., the nozzle 206 in FIG. 2B) at 1,300 psi.

Figure 6B:
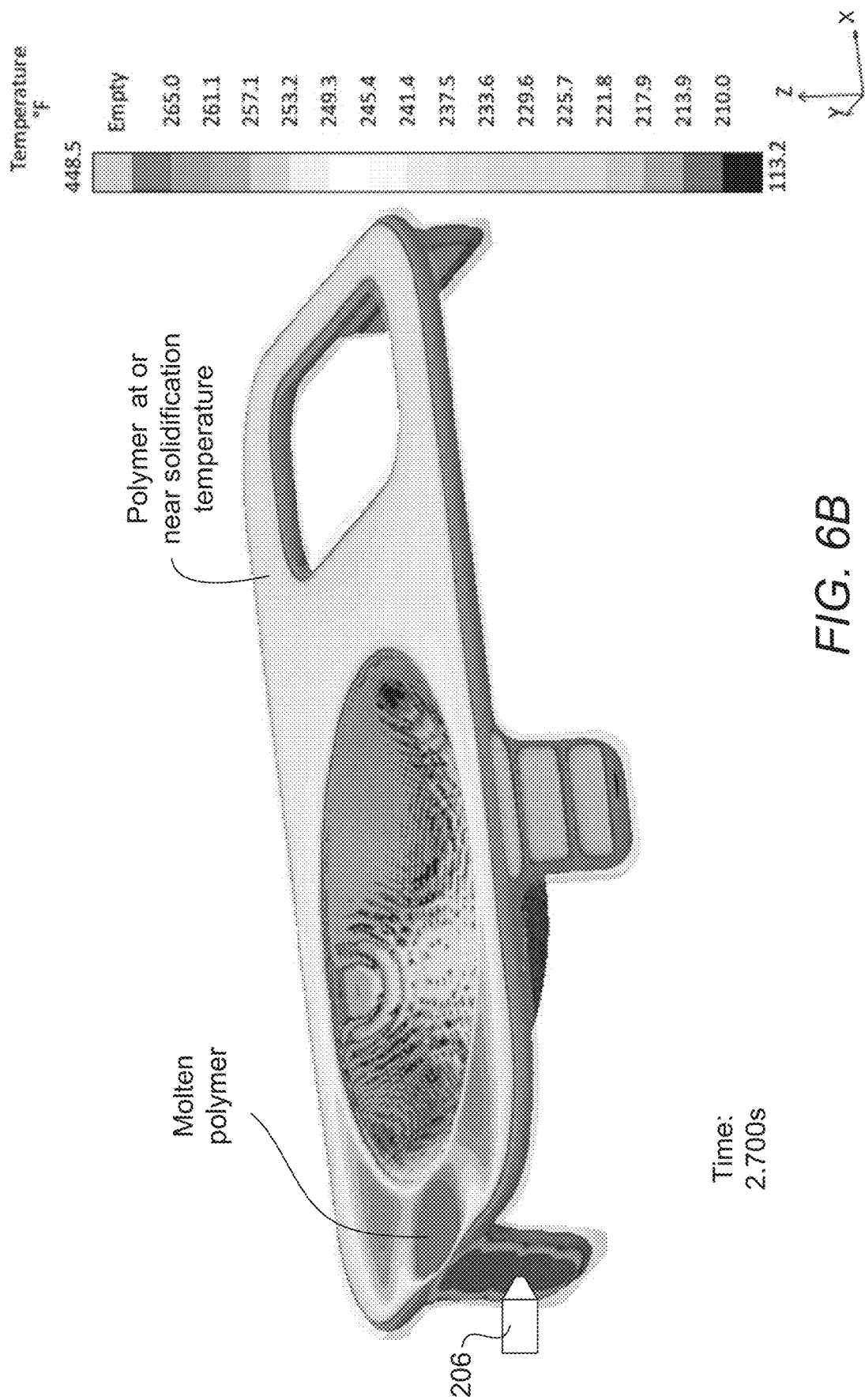

FIG. 6B, which corresponds to 2.700 seconds after the beginning of the simulated injection molding cycle, shows a moment during the hold phase in which the polymer forming the package is held at pressure equilibrium in the cavity.

Figure 6C:
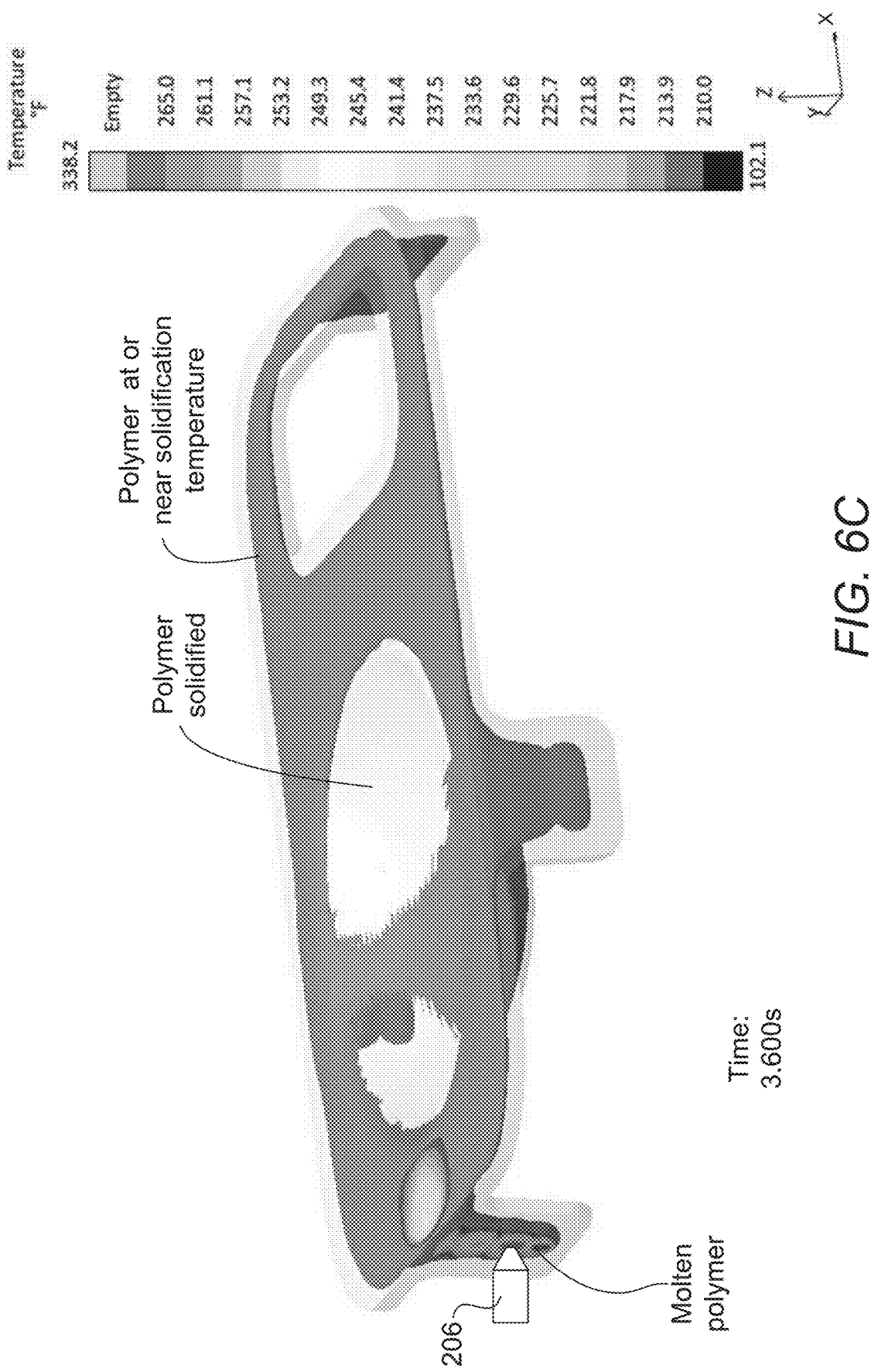

FIG. 6C, which corresponds to 3.600 seconds after the beginning of the simulated injection molding cycle, shows a moment during the cool phase in which some sections of the polymer have solidified, others are still at or near the solidification temperature, and others still molten. In the illustration in FIG. 6C, the lightest regions represent areas that have solidified, the darkest regions represent areas that are still molten, and the in-between colored regions represent areas in which the polymer is still at or near the solidification temperature. As shown, the highest heat values still appear in the areas closest to the laterally-facing wipe surface, which is immediately adjacent the nozzle 206. Some areas within the recess (e.g., 112) have solidified, and other areas are still cooling down.

Figure 6D:
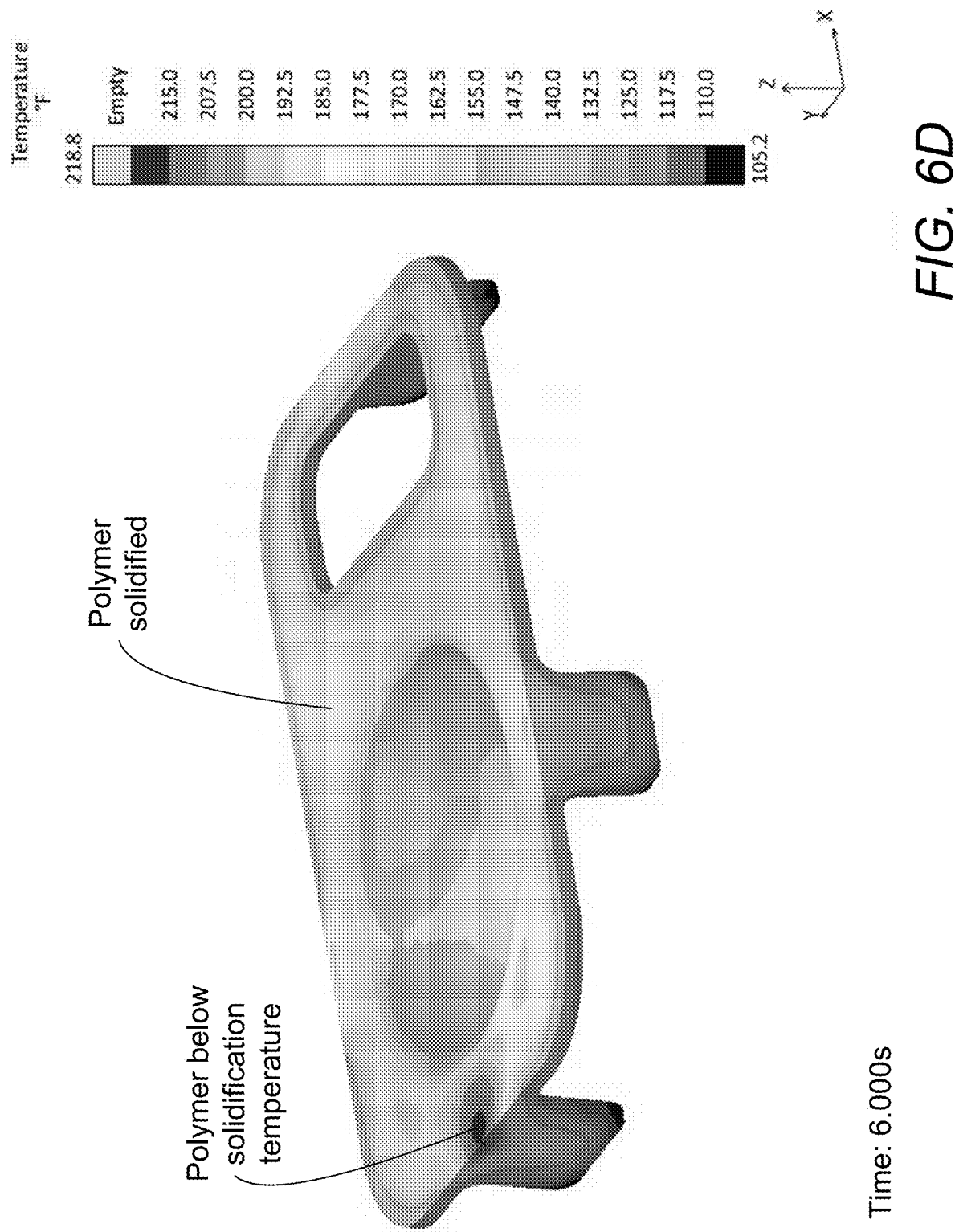

FIG. 6D, which reflects the 6.000 second point, shows a moment at the end of the cycle. At the end of the cycle, most sections of the polymer have solidified and only a small section is just below solidification temperature. In the illustration in FIG. 6D, all but the darkest regions represent areas that have solidified, while the darkest regions represent areas that have solidified, but are still close to the solidification temperature.

Figure 6E:
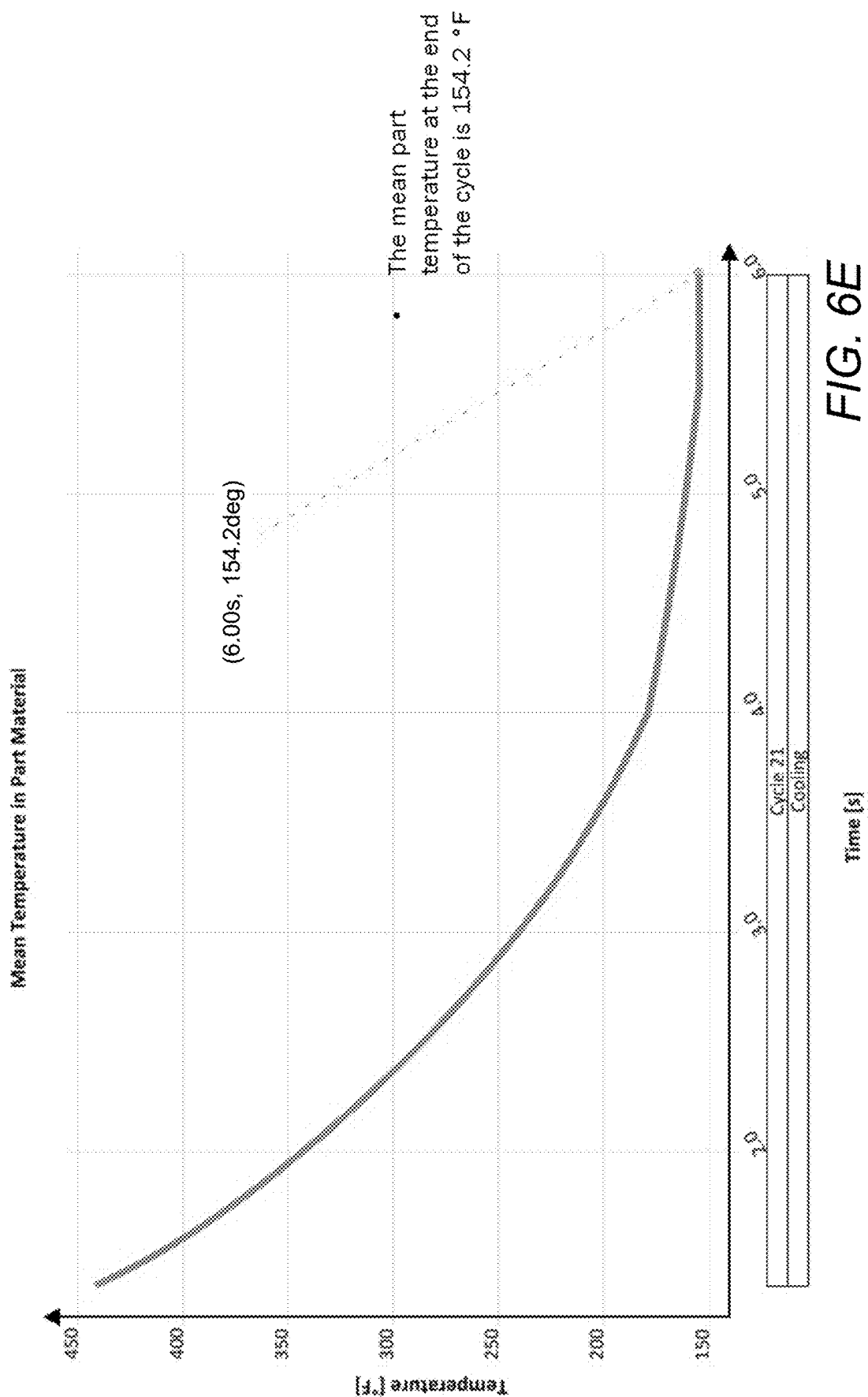
FIG. 6E is a graph of simulated mean temperature of the package of FIG. 1A being formed during the simulated injection molding cycle using side-gating and conventional cooling.

FIG. 6E is a graph of a mean temperature the package 100 (FIG. 1A) over the simulated injection molding cycle. The graph starts at the beginning of the fill phase of the simulated injection molding cycle. The mean part temperature at the end of the cycle is approximately 154.2° F. This is significantly lower than the mean part temperature determined through simulation of injection molding the package using valve gating and conventional cooling, as described in greater detail below. Stated differently, through the use of side-gating according to the various different techniques described herein, the cycle time for forming the package may be reduced (e.g., by reducing the cooling phase) while still achieving a mean part temperature associated with stable and repeatable quality of the package being formed. The lower mean part temperature at the end of the simulated injection molding cycle may be at least partially attributable to the position of the nozzle during side-gating, as compared to the position of the nozzle during valve-gating along a top surface of the package. For example, without wishing to be bound by theory, side-gating results in the high temperatures of the nozzle being away from the majority of the thermal mass of the package, thus facilitating more rapid cooling of the package as compared to cooling described below with respect to valve gating along a top surface of the package.

ii. Package Injection Molded Using Valve Gating and Conventional Cooling

The conditions associated with this simulation are the same as those described with respect to the side-gating simulation above, except the package is simulated as being formed by injection molding using valve-gating to deliver molten polymer through a nozzle 5 (FIG. 7A) along the top of the package, as is done in the prior art. Locations of virtual thermocouples used for this simulation are the same as those used for the side-gating simulation. Thus, locations of virtual thermocouples on sides of the package facing a first mold portion are denoted with the subscript "F," and are generally referred to as the top or front of the package. Locations of virtual thermocouples on sides of the package facing a second mold portion are denoted with the subscript "B" and are generally referred to as the bottom or back of the package. Thus, comparing of the results of the previous simulation with this simulation provides an indication of the advantages of side-gating according to the present disclosure as compared to valve-gating according to prior art techniques.

Figure 7A:
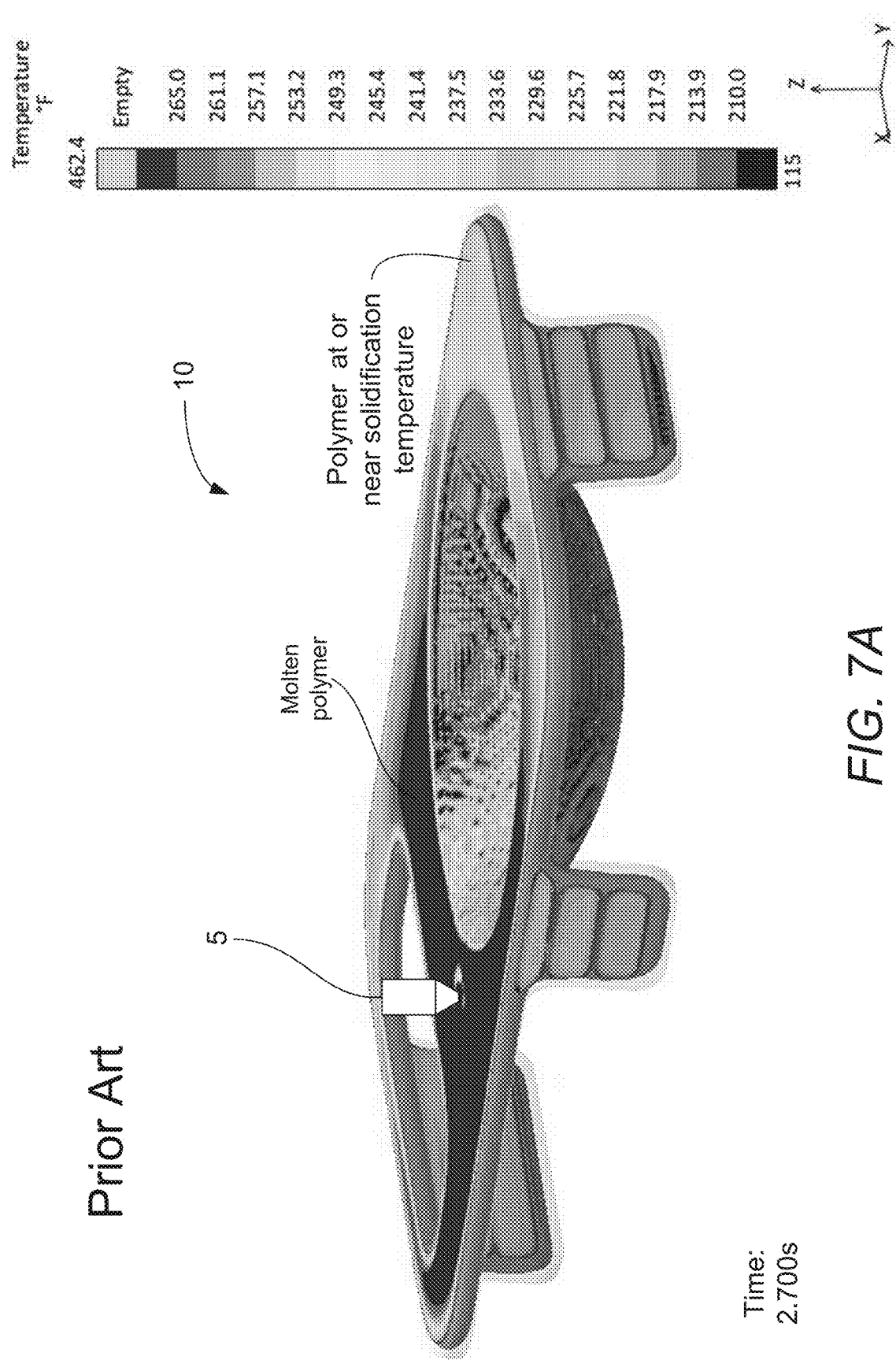
FIGS. 7A-7C are graphical representations of simulated temperature on a perspective view of a package for a contact lens, with the graphical representations showing simulated temperature distributions on surfaces of the package at various times during a simulated cycle of injection molding the package using valve gating according to the prior art and using conventional cooling.
Figure 7B:
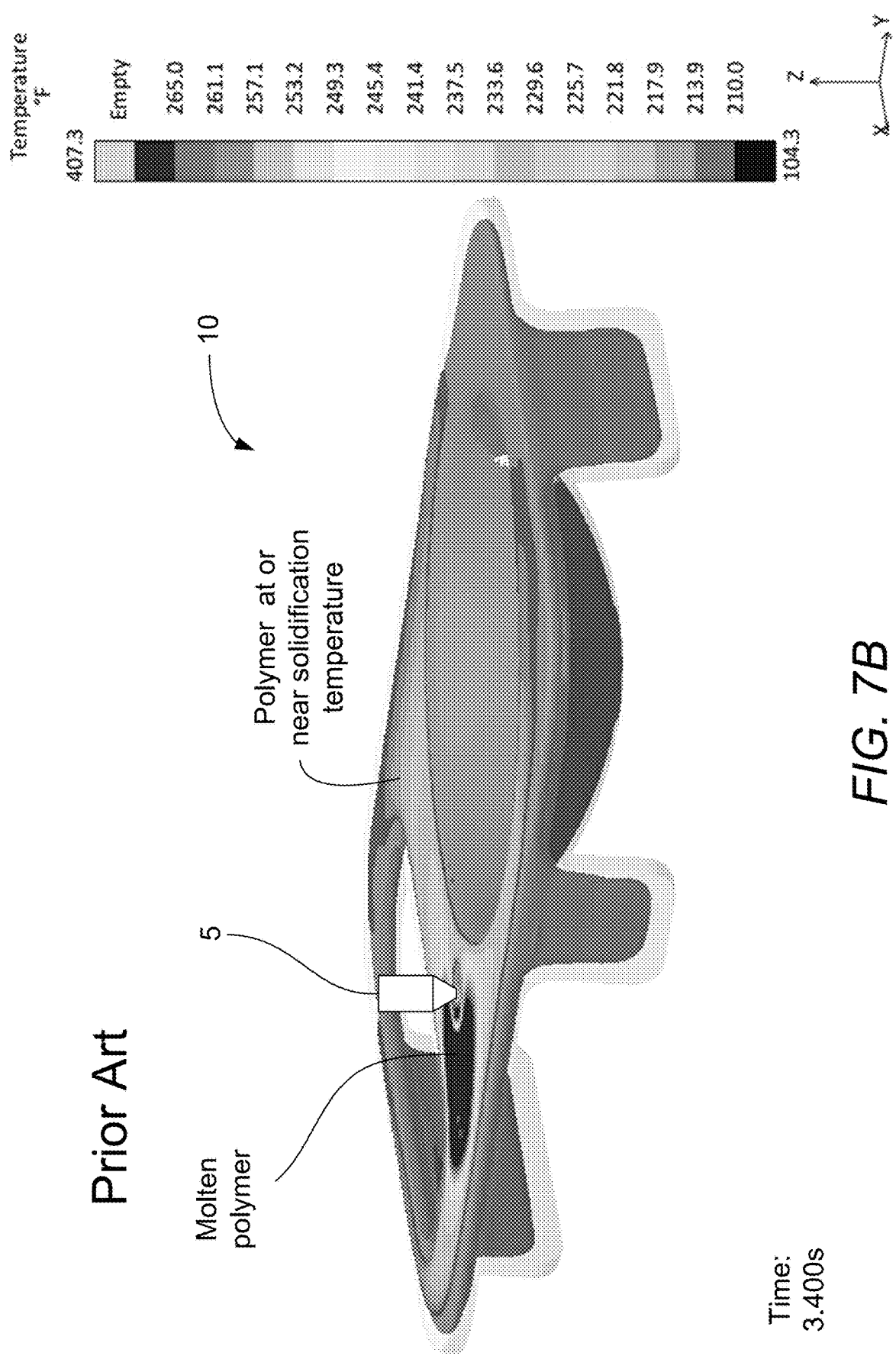
Figure 7C:
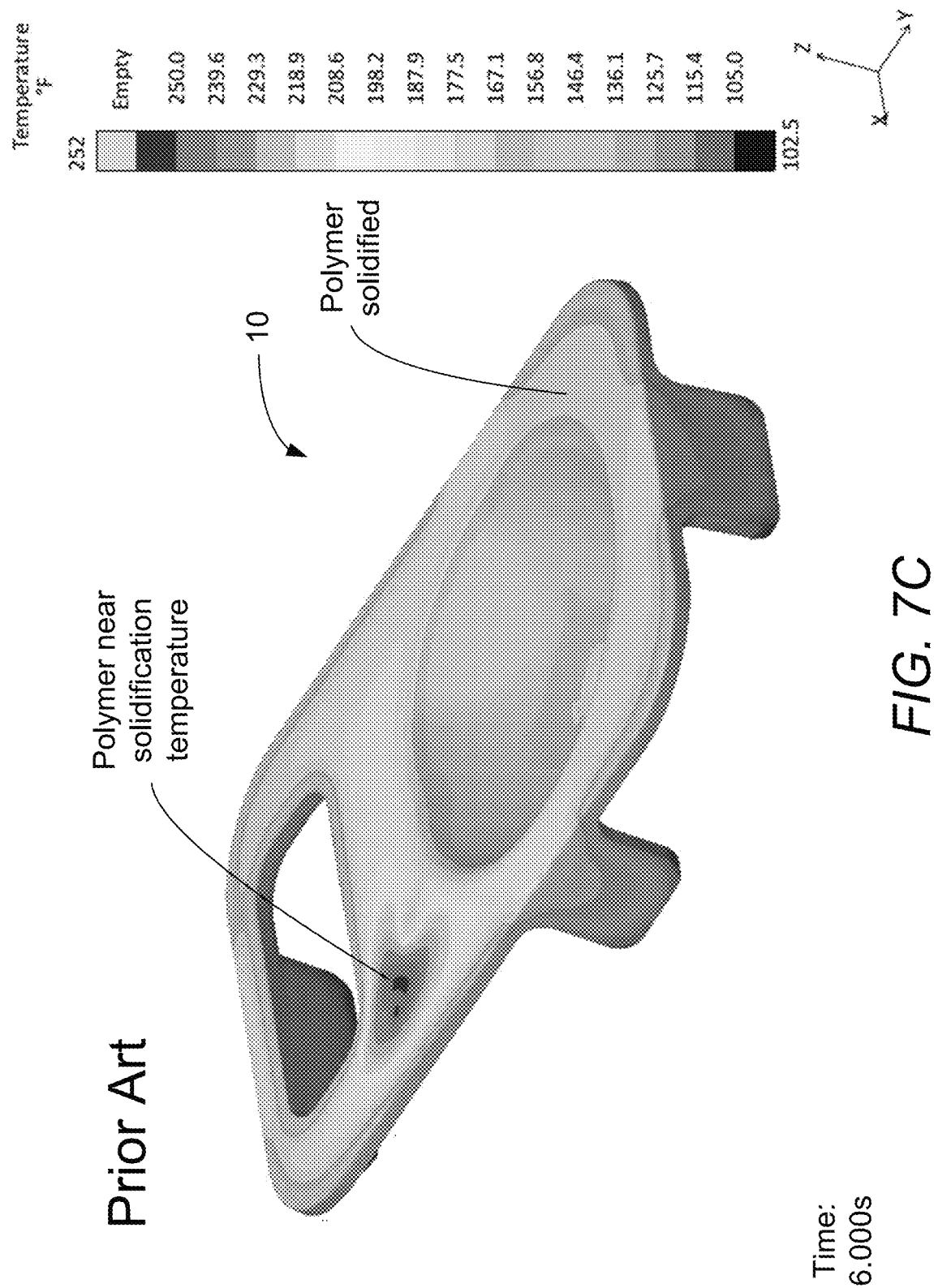

FIGS. 7A-7C illustrate temperature variations along a perspective view of a package 10 formed during a simulated injection molding cycle using valve gating and conventional cooling. FIG. 7A, which corresponds to 2.700 seconds after the beginning of the simulated injection molding cycle, shows a moment during the hold phase in which the polymer forming the package 10 is held at equilibrium pressure. FIG. 7B corresponds to 3.400 seconds after the beginning of the simulated injection molding cycle and shows a moment during the cool phase in which some sections of the polymer have solidified, others are still at or near the solidification temperature, and others still molten.

FIG. 7C corresponds to 6.000 seconds after the beginning of the simulated injection molding cycle and, thus, represents the end of the cycle. At the end of the cycle, most sections of the polymer have solidified and only a small section is near the solidification temperature.

Figure 7D:
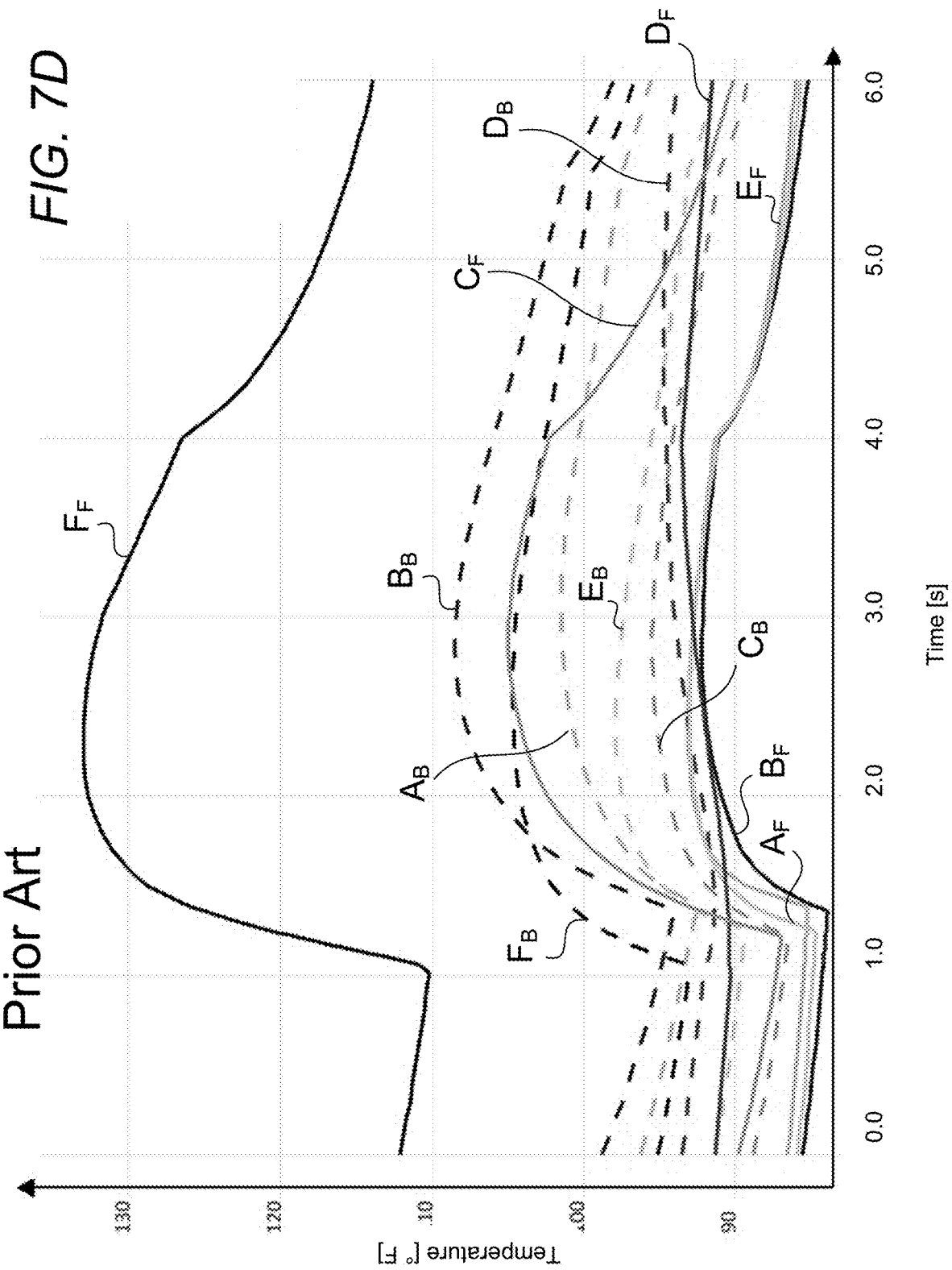
FIG. 7D is a graph showing simulated temperature distributions at front and back side surface regions of the package of FIGS. 7A-7C during the simulated cycle of injection molding the package using valve gating according to the prior art and using conventional cooling.

FIG. 7D is a graph of temperature at virtual thermocouple locations (analogous to those shown in FIG. 4 for the package 100), shown varying over the simulated injection molding cycle as the package 10 is formed using valve-gating according to prior art techniques and conventional cooling circuits. The temperature differentials between the front (F) and back (B) of the package at any given region (e.g., A, B, C, D, E, or F) provide a strong indicator of how stable that region is at a given time in the molding cycle. Front and back graph lines are included for temperatures near region F, which is adjacent the nozzle 5 used to introduce molten polymer into the cavity using valve-gating. The greater the differential or the more unevenly the top and bottom surfaces cool, the greater the likelihood that the package may warp and/or deform in that region, which may lead to surfaces not being flat as intended. Thus, as may be appreciated from a comparison of FIG. 7D and FIG. 5J, the heat differential between the front and back surfaces at region F using valve-gating according to prior art techniques is much higher than what the simulations indicate is achievable using side-gating according to various techniques described herein. That is, the simulations suggest that injection molding using side-gating to form the package for a contact lens may be less likely to warp and/or deform, as compared to injection molding using prior art valve-gating techniques to form a package for a contact lens.

Figure 7E:
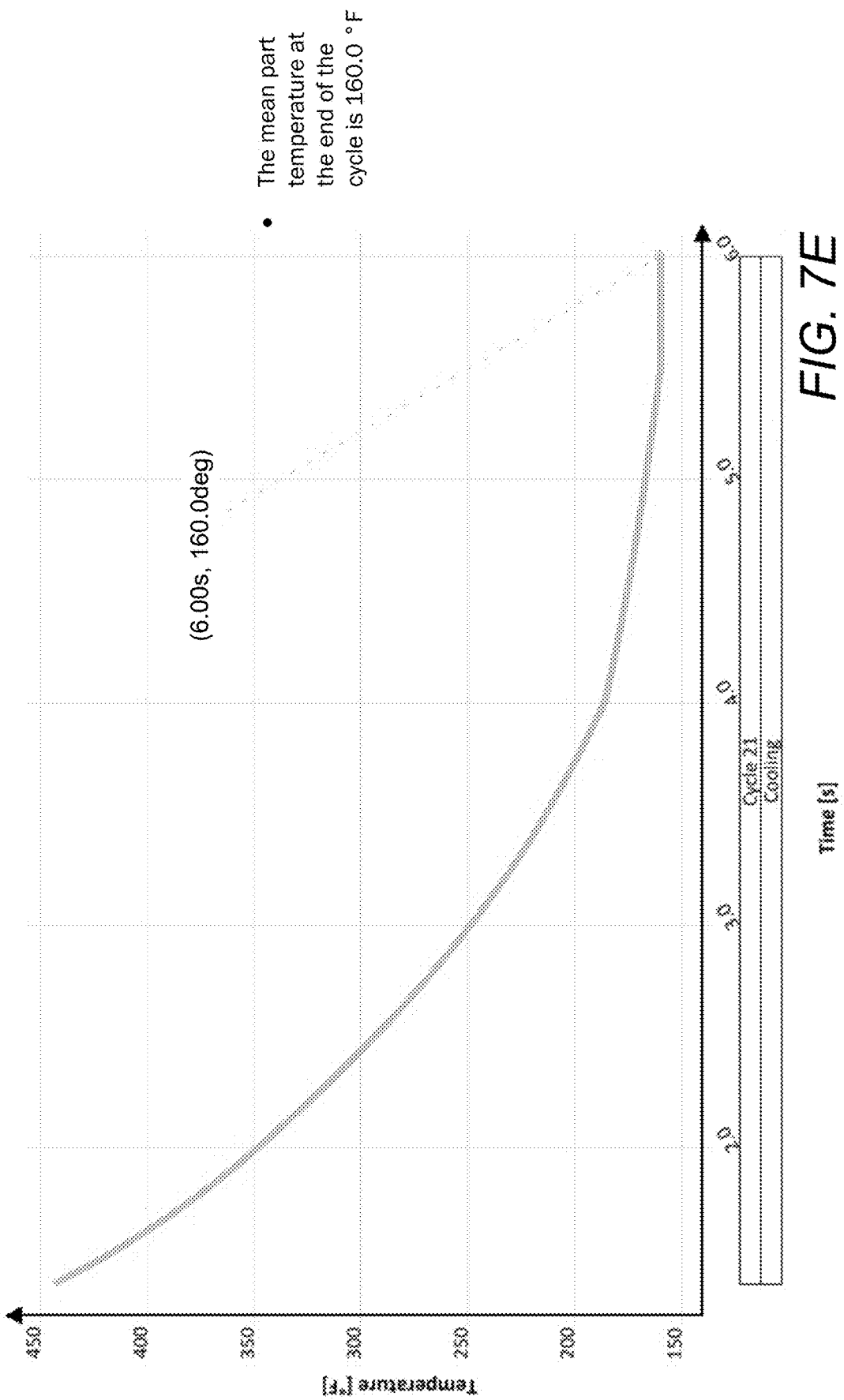
FIG. 7E is a graph of simulated mean temperature of the package of FIGS. 7A-7C being formed during the simulated cycle of injection molding the package using valve gating according to the prior art and using conventional cooling.

FIG. 7E is a graph of a mean temperature of the package 10 (FIG. 7A) over the simulated injection cycle. The graph starts at the beginning of the fill phase of the simulated injection molding cycle. The mean part temperature at the end of the cycle is 160.0° F. As discussed above, this is significantly higher than the mean part temperature at the end of the simulated injection molding cycle for the package 100 (FIG. 1A) formed according to the various, different techniques described herein. That is, for a given target temperature at the end of the simulated injection molding cycle, valve-gating along a top surface of the package 10 according to the prior art appears to require a longer cooling time than is required to cool the package 100 (FIG. 1A) formed using the side-gating techniques described herein.

ii. Package Injection Molded Using Valve Gating and Conformal Cooling

The conditions associated with this simulation are the same as those described with respect to the valve gating simulation described above, except conventional cooling is replaced with conformal cooling to assess whether a change in the cooling circuit may be used to achieve a reduction in cycle time on the order of the reduction that appears to be achievable through the use of side-gating for injection molding a contact lens packaging. As compared to the conventional cooling circuits used for the above-described simulations, the conformal cooling circuit used for this simulation shall be understood to have a geometry including curved channels that closely follow the shape of the cavity in which a package is injection molded. Locations of virtual thermocouples used for this simulation are the same as those used for the side-gating simulation. Thus, locations of virtual thermocouples on sides of the package facing a first mold portion are denoted with the subscript "F," and are generally referred to as the top or front of the package. Locations of virtual thermocouples on sides of the package facing a second mold portion are denoted with the subscript "B" and are generally referred to as the bottom or back of the package.

Figure 8A:
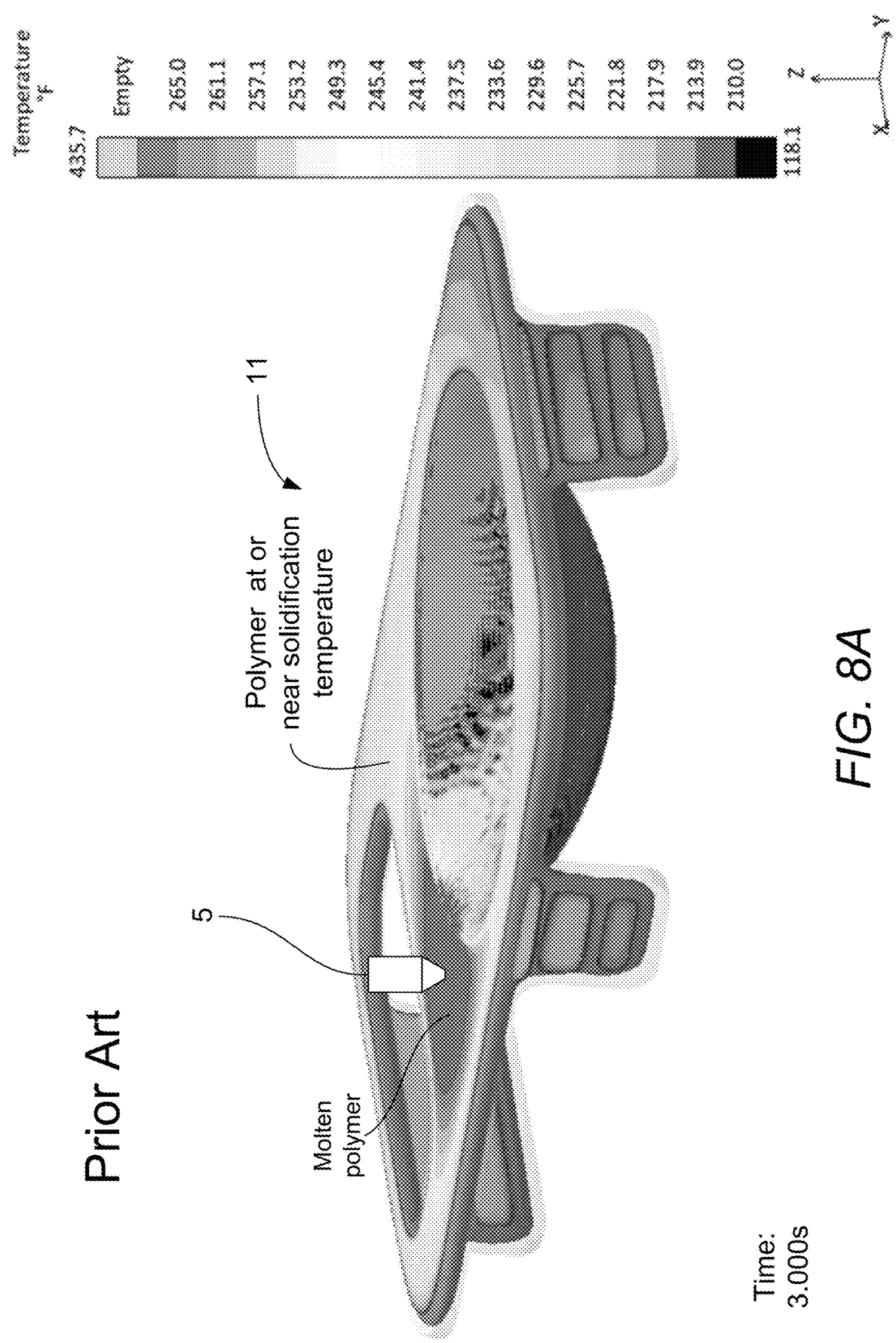
FIGS. 8A-8C are graphical representations of simulated temperature on a perspective view of a package for a contact lens, with the graphical representations showing simulated temperature distributions on surfaces of the package at various times during a simulated cycle of injection molding the package using valve gating according to the prior art and using conformal cooling.
Figure 8B:
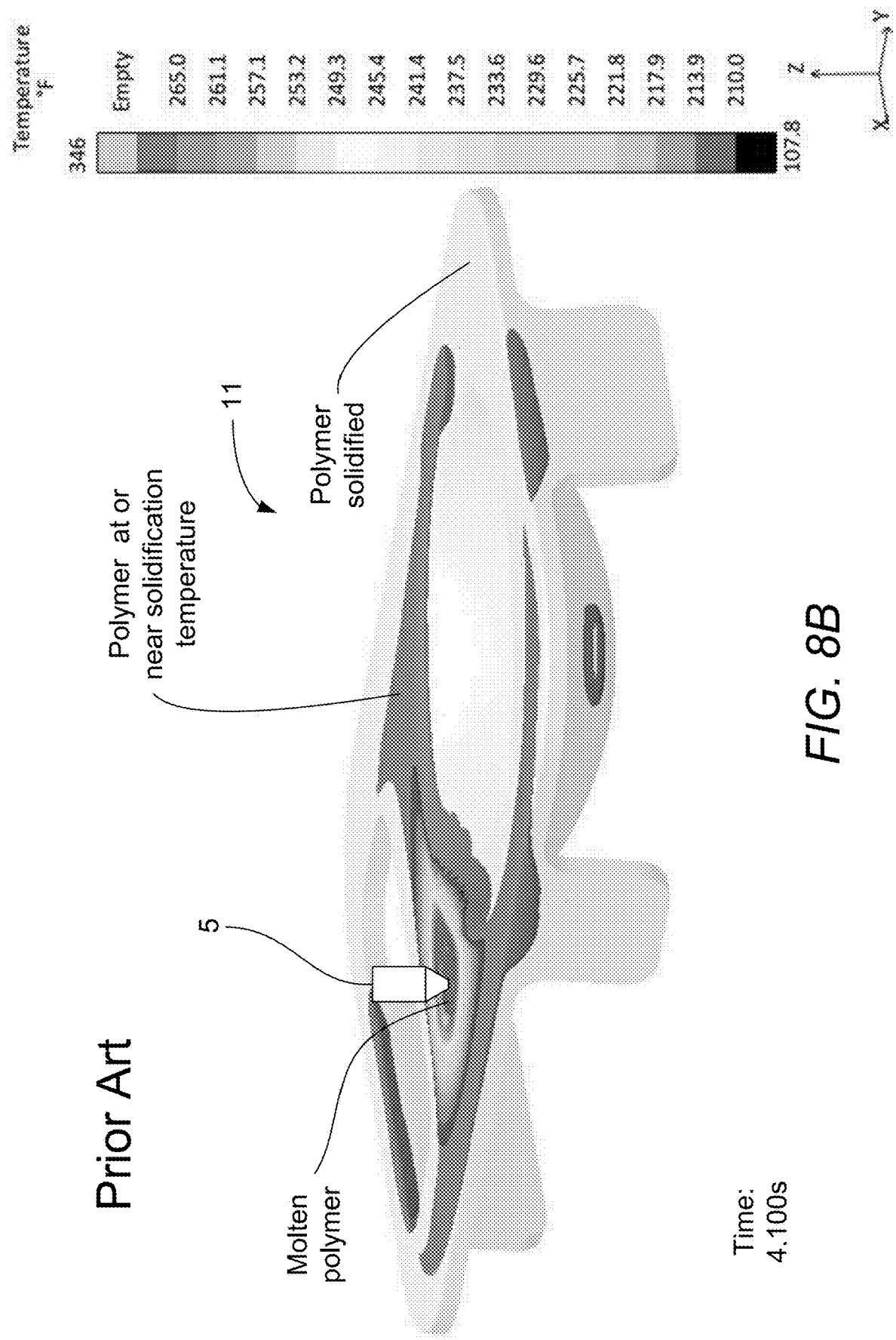
Figure 8C:
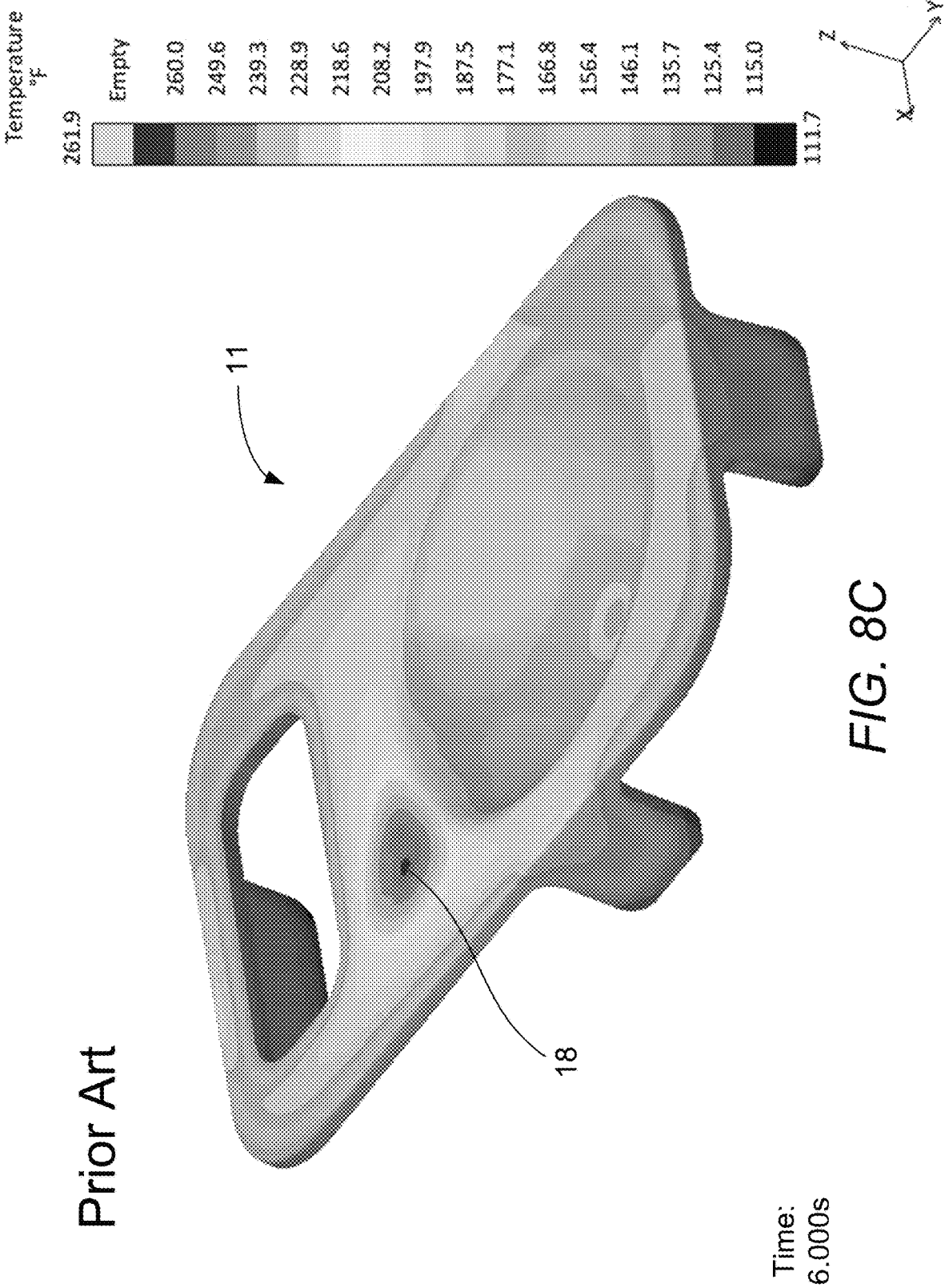

FIGS. 8A-8C illustrate temperature variations along a perspective view of a package 11 formed during a simulated injection molding cycle using valve gating and conformal cooling. FIG. 8A, which corresponds to 3.000 seconds after the beginning of the simulated injection molding cycle, shows a moment during the hold phase in which the polymer is held at equilibrium pressure in the cavity. FIG. 8B, which corresponds to 4.1 seconds after the beginning of the simulated injection molding cycle, shows a moment during the cool phase in which some sections of the polymer have solidified, others are still at or near the solidification temperature, and others still molten. FIG. 8C, which corresponds to 6.000 seconds after the beginning of the simulated injection molding cycle, shows a moment at the end of the cycle.

FIG. 8D is a graph of temperature at virtual thermocouple locations (analogous to those shown in FIG. 4 for the package 100), shown varying over the simulated injection molding cycle as the package 11 is formed using valve-gating according to prior art techniques and conformal cooling. The temperature differentials between the front (F) and back (B) of the package at any given region (e.g., A, B, C, D, E, or F) provide a strong indicator of how stable that region is at a given time in the simulated injection molding cycle. Front and back graph lines are included for temperatures near region F, which is adjacent the nozzle 5 (FIG. 8A). The greater the differential or the more unevenly the top and bottom surfaces cool, the greater the likelihood that the package may warp and/or deform in that region, which may lead to surfaces not being flat as intended. Thus, even with conformal cooling, the use of valve gating for injection molding to form the package 11 according to prior art techniques may be more prone to warping and/or deformation than forming a contact lens package using side-gating according to the techniques described herein.

Figure 8E:
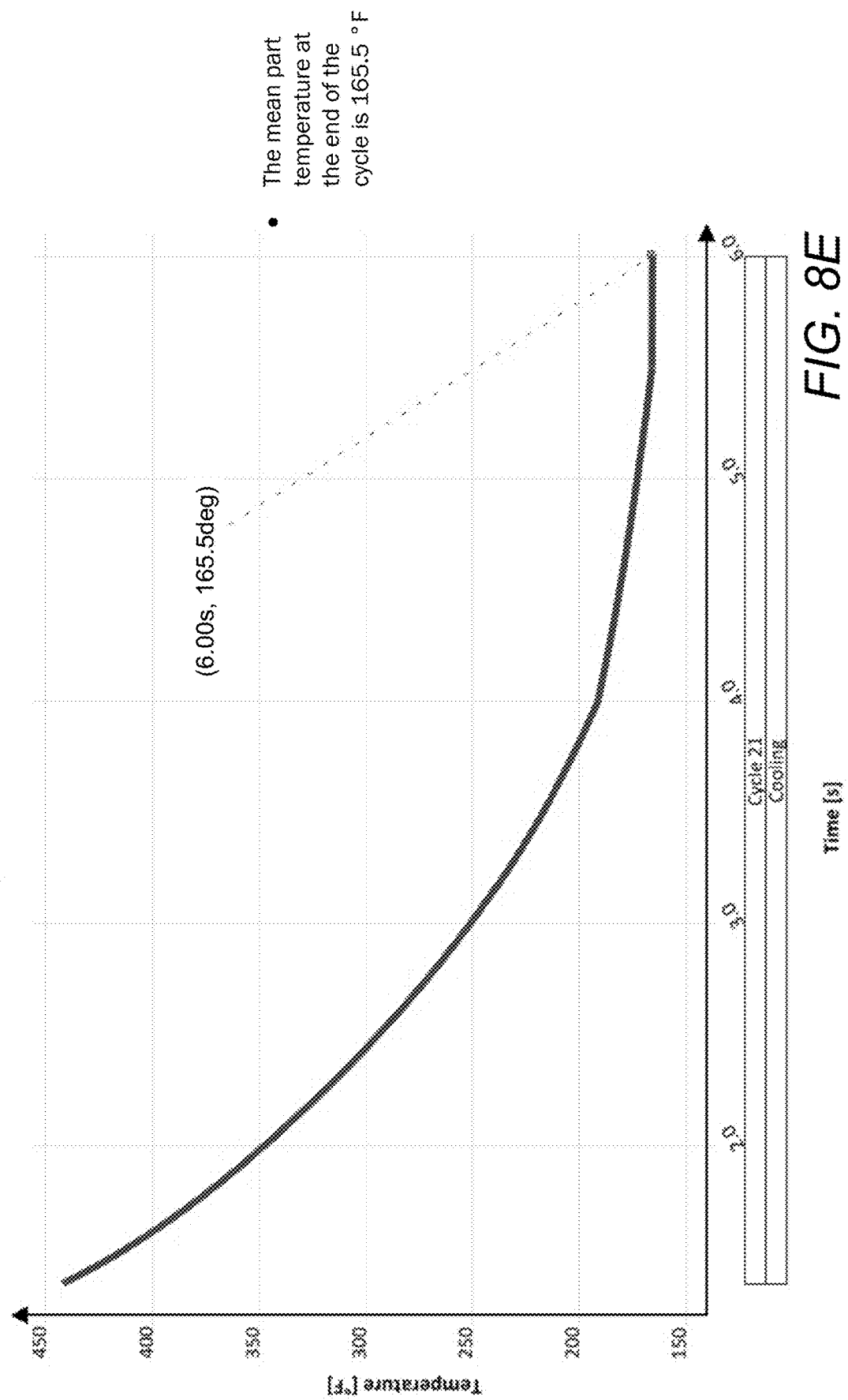
FIG. 8E is a graph of simulated mean temperature of the package of FIGS. 8A-8C being formed during the simulated cycle of injection molding the package using valve gating according to the prior art and using conventional cooling.

FIG. 8E is a graph of a mean temperature of the package 11 (FIG. 8A) over the simulated injection cycle. The graph starts at the beginning of the fill phase of the simulated injection molding cycle. The mean part temperature at the end of the simulated injection molding cycle is 165.5° F., which is significantly higher than the mean part temperature at the end of the cycle in accordance with various embodiments (see, FIG. 6E). Thus, this simulation indicates that valve-gating according to prior art techniques in combination with conformal cooling does not appear to offer the same potential for shorter cycle times as was observed in the simulation results corresponding to injection molding using side-gating according to the techniques described herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A package for a contact lens, the package comprising:
    a base including a first surface and a second surface, the first surface opposite the second surface, the first surface and the second surface forming a reservoir, the first surface concave along the reservoir and defining a recess, the second surface convex along the reservoir, the first surface forming a rim region circumscribing the recess, and the rim region defining a plane;
    one or more walls, at least one of the one or more walls including a wipe surface and at least one draft surface, the at least one draft surface extending from the base in at least one direction oblique to the plane defined by the rim region, and the wipe surface perpendicular to the plane defined by the rim region; and
    wherein the wipe surface is located on the same wall as the at least one draft surface.

2. The package of claim 1, wherein the first surface has a first surface area, the second surface has a second surface area, a third surface area is collectively defined by the wipe surface and the at least one draft surface, and the third surface area less than at least one of the first surface area or the second surface area.

3. The package of claim 1, wherein the wipe surface and the at least one draft surface each face away from the reservoir.

4. The package of claim 1, wherein the wipe surface is spaced apart from each one of the first surface and the second surface.

5. The package of claim 1, wherein the reservoir has a curvilinear two-dimensional profile perpendicular to the plane defined by the rim region of the first surface.

6. The package of claim 1, wherein the base and the one or more walls are formed of at least on polymer.

7. The package of claim 1, wherein the rim region defines an orifice extending from the first surface to the second surface of the base.

8. The package of claim 7, wherein, along the plane defined by the rim region of the first surface of the base, the recess is between the orifice and at least one of the one or more walls.

9. The package of claim 7, wherein the recess has a first area along the plane, the orifice has a second area along the plane, and the first area is greater than the second area.

10. The package of claim 1, wherein the one or more walls and the reservoir are sized to support the plane defined by the rim region in a stable orientation with the one or more walls and the reservoir positioned on a horizontal surface and the rim region facing away from the horizontal surface.

* * * * *